United States Patent
Peters

(10) Patent No.: US 9,874,298 B2
(45) Date of Patent: Jan. 23, 2018

(54) MULTI-LAYERED STRETCHABLE HOSE

(71) Applicant: Woods Hole Oceanographic Institution, Woods Hole, MA (US)

(72) Inventor: Donald B. Peters, Falmouth, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 193 days.

(21) Appl. No.: 14/743,551

(22) Filed: Jun. 18, 2015

(65) Prior Publication Data
US 2016/0369919 A1 Dec. 22, 2016

(51) Int. Cl.
| | |
|---|---|
| F16L 11/08 | (2006.01) |
| G01V 1/16 | (2006.01) |
| G10K 11/00 | (2006.01) |
| F16L 58/00 | (2006.01) |
| H01B 7/04 | (2006.01) |
| H02G 3/04 | (2006.01) |
| F16L 11/04 | (2006.01) |
| F16L 11/10 | (2006.01) |

(52) U.S. Cl.
CPC .............. *F16L 11/08* (2013.01); *F16L 11/086* (2013.01); *F16L 11/087* (2013.01); *F16L 58/00* (2013.01); *G01V 1/16* (2013.01); *G10K 11/006* (2013.01); *H01B 7/045* (2013.01); *H02G 3/0468* (2013.01); *F16L 11/04* (2013.01); *F16L 11/083* (2013.01); *F16L 11/10* (2013.01); *Y10T 29/49826* (2015.01)

(58) Field of Classification Search
CPC ........... F16L 11/04; F16L 11/10; F16L 11/083
USPC ................................ 138/126, 127, 129, 134
See application file for complete search history.

(56) References Cited

U.S. PATENT DOCUMENTS 8,279,714 B2 * 10/2012 Paul ...................... F16L 11/086
367/12
8,867,315 B2 * 10/2014 Paul ...................... F16L 11/086
367/12

OTHER PUBLICATIONS

Paul, Walter; Hose Elements for Buoy Moorings: Design, Fabrication and Mechanical Properties; Jul. 2004; Woods Hole Oceanographic Institute; Technical Report WHOI-2004-06; see entire document.*

* cited by examiner

*Primary Examiner* — Craig Schneider
*Assistant Examiner* — David Deal
(74) *Attorney, Agent, or Firm* — Goodwin Procter LLP

(57) ABSTRACT

The systems and methods described herein relate to an improved stretchable hose apparatus which enables the transmission of high-throughput signals along several conductors within a conductor cable. In particular, the stretchable hose enables consistent high speed communications and high power transmission between a buoyant object and an optional underwater device in all weather conditions by permitting compression of the conductor cable in a first range of hose extensions and limiting elastic elongation of the conductor cable in a second greater range up to full hose extension.

35 Claims, 13 Drawing Sheets

MULTI-LAYERED STRETCHABLE HOSE

CROSS REFERENCE TO RELATED APPLICATIONS

This application incorporates by reference the U.S. Provisional and Non-Provisional Patent Application No. 61/201,011, filed on Dec. 5, 2008, Ser. No. 12/632,632, filed on Dec. 7, 2009, and Ser. No. 13/572,050, filed on Aug. 10, 2012, the contents of which are hereby incorporated as if set forth herein in its entirety.

FIELD OF THE INVENTION

The apparatus and methods described herein relate to hoses capable of cyclic stretching, which can occur frequently in marine environments. In particular, the apparatus and methods described herein can be used for moorings, power lines for high power applications, and high bandwidth data transfer purposes, both in and out of marine environments.

BACKGROUND OF THE INVENTION

Offshore moorings, whether for buoys or floating marine installations, are typically required to allow significant vertical and horizontal motions of the surface buoy, since the buoys are designed with sufficient buoyancy to follow the contours of the ocean waves which can be 30 ft or higher in storms depending on location. The wave-generated buoy (or ship) motions are known as heave and surge (vertical and horizontal motions, respectively). A sensor, for instance a hydrophone with its surrounding cage, connected to the surface buoy with a taut mooring cable will be rapidly lifted, lowered, and simultaneously more slowly oscillated sideways due to the constantly changing position of the contour of the passing by ocean waves, which the buoy is forced to follow. In particular, the heave and drop motion can be quite rapid, reaching speeds of 1 to 1.5 meters/second (3 to 5 ft/second). This motion can lead to inconsistent operation of the device, and the communications within the hose may be subject to intermittent or permanent failure.

Demands for faster communication, additional communication channels, and more power are driving the need to construct stretchable hoses which may be structurally adapted to address these needs. Furthermore, many of these communication and power demands are also linked to increased load bearing needs. For example, buoys comprising meteorological sensors, communication systems, solar devices, water instruments, etc. are often substantially heavier and apply larger tensile loads on the attached hose moorings.

Stretch hoses which may stretch up to 300 percent of their original resting length were developed to address many of the issues described above. Some of these hoses/moorings even featured embedded electrical conductors to allow signal transfer through the hose. The invention described herein provides an advancement in stretchable hose technology with improved extension length, strength capacity, and fatigue life in addition to the capability to carry high speed data and high power.

SUMMARY OF THE INVENTION

The hose described herein, in one aspect, enables the high-throughput transfer of power and/or data between a buoyant object or station and a submerged entity in contact with a stretchable mooring in a 24/7 all-weather capacity. Such a robust and fatigue-resistant long-life connection is particularly valuable for moored systems such as Marine Hydrokinetic (MHK) devices, floating platforms (e.g., oil rigs, offshore platforms), and ship moorings.

The systems and methods described herein are directed to stretchable hose systems for use with a mooring, other suitable surface station, or any two entities where at least one is exposed to cyclic loading. For purposes of clarity, and not by way of limitation, the systems and methods may be described herein in the context of stretchable hose systems for connecting a buoyant object or surface station to an optional underwater device. However, it may be understood that the systems and methods described herein may be applied to provide for any type of high stretch hose system. For example, the high stretch hose system may have a working elongation of 30 percent and higher. Various parameters may be optimized for a given application, such as designing a hose for operation elongation of over approximately 50 percent (i.e., 1.5× original length) with ultimate elongation approaching 100 percent (i.e., 2× original length) for applications requiring higher strength but potentially lower compliance. A proper balance could be achieved by constructing a hose with a larger inner diameter to allow for greater strength member buildup in the hose, which could also allow for a greater number of conductor cables per layer, as described in greater detail below. In other high stretch hose configurations, the hose may have an operational elongation of over 100 percent (i.e., 2× original length) with an ultimate improved stretch length greater than 200 percent and approaching 300 percent (i.e., 4× original length). Such high compliance reduces mooring peak loads, isolate mooring systems from disruptive surface buoy motions (e.g., allow for high-stability and low-noise mooring instrumentation coupled with a surface expression that provides power and/or telemetry to the instrumentation), and provide a fatigue-resistant and long-life conductor pathway between mooring elements, surface stations, or buoyant objects that experience highly dynamic motions over extended (years) deployments.

The hose design and its terminations as described herein are designed and built for the purpose of being a highly compliant, multi-layered stretchable hose and ocean-resistant conductor carrier with a higher tensile strength capacity capable of managing tensile loads up to 50,000 lbs or more.

According to one aspect, the stretchable hose apparatus comprises a plurality of layers including strength member, stretch limiter, and reinforcement layers, further comprised of an elastomeric material, helically wrapped about an inner liner layer in an arrangement adapted to stretch a predetermined amount to accommodate a predicted vertical heave of a buoyant object wherein the hose may provide increased elongation properties greater than 200 percent and/or an increased tensile strength of between about 1,000 lbs and about at least 50,000 lbs. The stretchable hose apparatus described herein demonstrates increased fatigue resistance when deployed in the marine environment and is adapted to survive about 1 million to about 10 million stretch cycles. The strength member layers generally wrap at a strength member helical wrap angle of between about 60 degrees and about 85 degrees relative to the cable axis. The stretchable hose employs the stretch limiter layers wrapped at stretch limiter wrap angles between 25 degrees and about 75 degrees. A reinforced outer jacket is applied to protect the cables, the conductors, and the other hose layers from external pressure, cuts, fish bite, and corrosion and increase the tensile strength capacity of the hose design.

In certain embodiments, the stretchable hose apparatus further comprises at least one conductor cable helically wrapped at a steep wrap angle between the plurality of strength member, stretch limiter, and reinforcement layers. The conductor cable or cables are wrapped at angles between about 64 degrees and about 84 degrees relative to the cable axis, substantially steeper than the stretch neutral angle known in the art, which then more efficiently utilizes the hose volume and results in a smaller diameter hose while still properly securing each cable. Such a cable configuration may be utilized by bearing the tensile loads onto the hose body layers and removing loads from bearing upon the conductor cables. The conductor cables comprise a conductive cross-sectional area capable of high-throughput such as high speed data and communications or high power. The conductor cables wrap around the stretch hose body to an ocean-resistant coupling adapted to pass the conductor cables from within the plurality of layers through the hose coupling to an external surface with exposure to water or corrosion.

In some embodiments, the stretchable hose apparatus is manufactured by a method comprising the steps of providing an inner liner layer defining a central core, wrapping an inner strength member set comprising at least one layer with reinforcing fiber cords in a forward helical direction about the inner liner layer in overlapping convolutions, wrapping a first stretch limiter set in a forward helical direction about the inner strength member set, wrapping a reinforcement layer about the first stretch limiter set, wrapping a second stretch limiter set about the reinforcement layer in a counter helical direction, and wrapping an outer strength member set comprising at least one layer with reinforcing fiber cords in a counter helical direction about the second stretch limiter set in overlapping convolutions. The stretchable hose then may be optionally counter helically wrapped with at least one high-throughput conductor cable at a steep wrap angle between forward wrapped reinforcement layers wherein the reinforcement layer helically wrapped around the cable forms a first helical ridge corresponding to the first cable, and the first helical ridge forms a helical valley. One or more additional cables may be secured and insulated with a reinforcement layer helically wrapped around the cable, wherein the additional cable is disposed adjacent to the first helical ridge in the helical valley. The conductor cables are wrapped at one or more steep wrap angles between about 64 degrees and about 84 degrees, and in specific embodiments, at steep wrap angles between about 70 degrees and about 80 degrees.

The conductor cable generally comprises at least two conductors to facilitate high-throughput and to increase the number of individual conductive paths with at least two conductors arranged in a twisted pair, and often further comprising two or more twisted pairs. The conductor cables are adapted to carry high-throughput of at least megabit Ethernet over at least about 50 to about 100 foot lengths of the hose or gigabit Ethernet over fiber or high-throughput of at least about 1 kilowatt to about 1 megawatt of power. The wrapped layers are then applied with a reinforced outer jacket comprising at least one protective layer to provide additional resistance to external pressure, fish bites, and corrosion. The completed stretchable hose is heat cured to increase the tensile strength capacity. Optionally, the hose optionally may further comprise an outer helical surface ridge disposed on an outer layer of the hose to transverse fluid flow and reduce drag.

BRIEF DESCRIPTION OF THE DRAWINGS

The foregoing and other objects and advantages of the systems and methods described herein will be appreciated more fully from the following further description thereof, with reference to the accompanying drawings wherein.

DETAILED DESCRIPTION OF THE ILLUSTRATED EMBODIMENTS

The systems and methods described herein relate to a multi-layered stretchable hose apparatus adapted for use with oceanographic surface buoy mooring systems in most sea state and weather conditions. In particular, the systems and methods described herein provide an improved stretchable hose that can provide communications between separate end points, including between a buoyant object or other floating platform (e.g., surface buoy, offshore rig, raft, wind turbine, moored vessel) and optionally a submerged entity (e.g., a listening device, a sensor, an ocean bottom observatory, an instrument) connected to a surface buoy located at a deep or shallow-water offshore position. As will be more fully described below, the stretchable hose stretches and contracts in response to waves and weather.

Figure 1A:
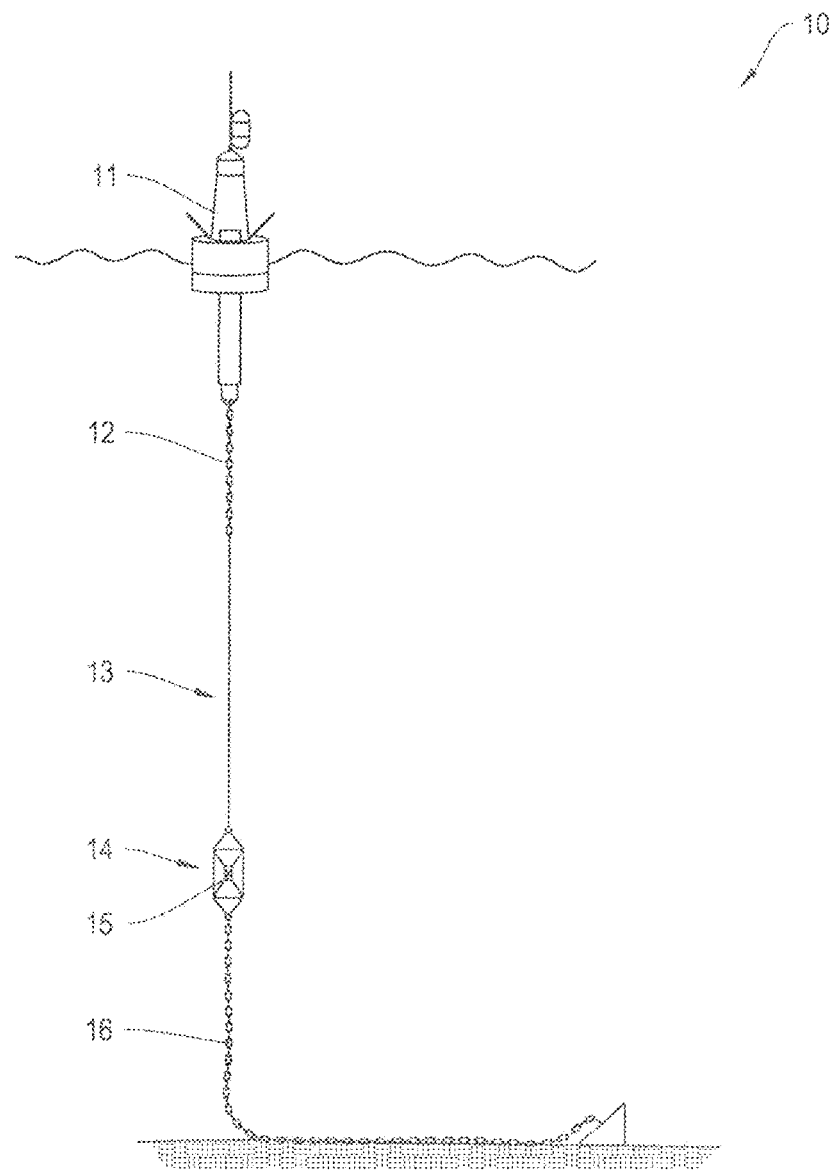
FIGS. 1A and 1B depict buoy moorings, according to illustrative embodiments.
Figure 1B:
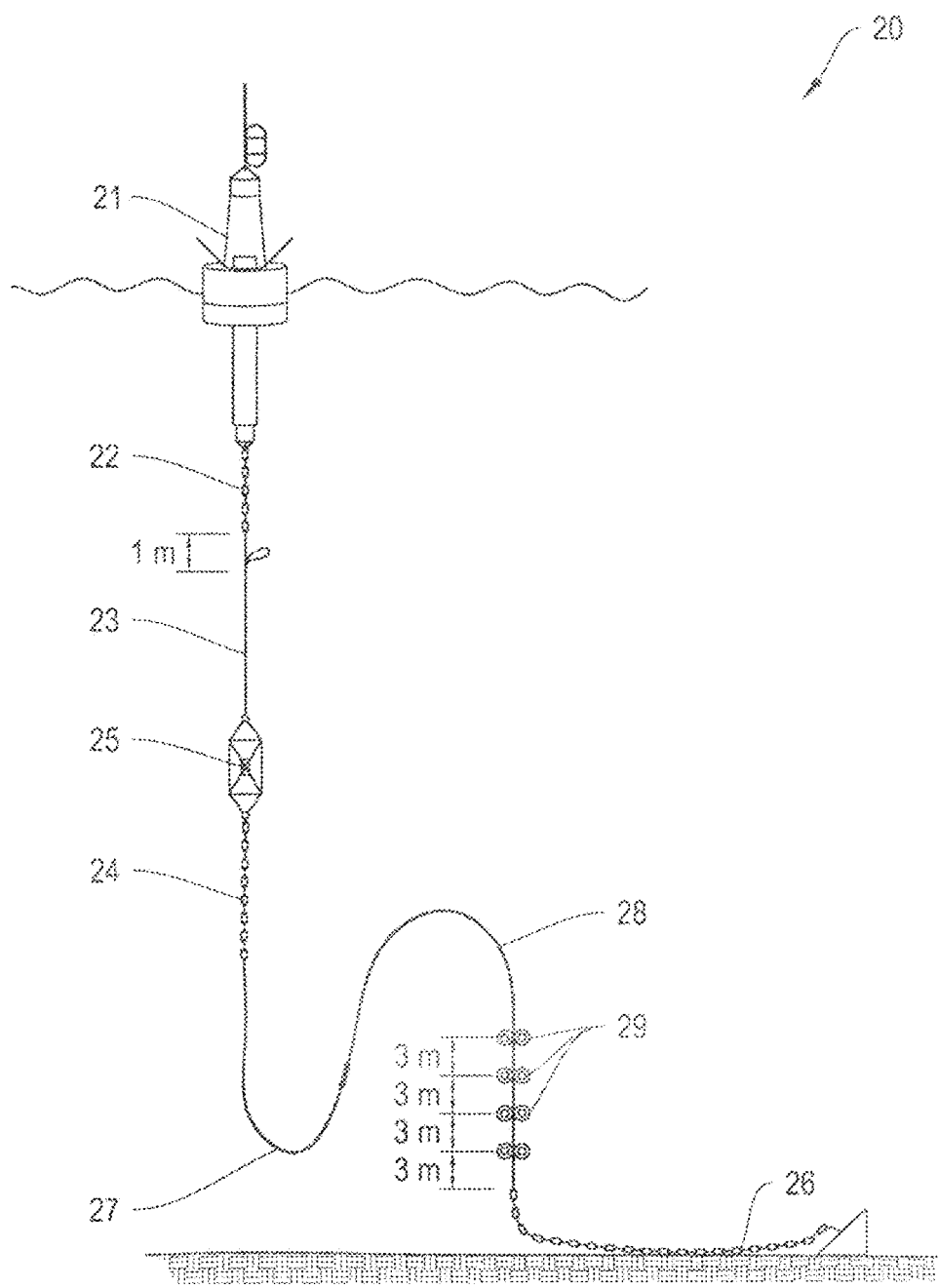

FIGS. 1A and 1B depict conventional buoy systems 10 and 20 typically used for shallow water depths. In particular, FIG. 1A shows a system 10 for water depths up to 40 meters. System 10 includes a buoyant object 11 connected to a urethane embedded chain 12 with an electrical conductor link. The urethane embedded chain link connects to an electro-mechanical cable 13, which may couple to a cage 14 containing a device 15 (e.g., a hydrophone, geophone, ocean bottom seismometer (OBS), an Autonomous Underwater Vehicle (AUV) power charging dock, a sonar device, an acoustic Doppler current profiler (ADCP), or other suitable sensor). Below this cage 14 is a length of mooring chain 16, which may be significantly longer than the vertical distance from the cage termination to the sea floor. The buoyant object moves up and down in the sea and is constantly adjusting the mooring length by raising or lowering sufficient chain length from or to the sea floor. Following the constantly oscillating sea surface contour, the buoyant object raises and lowers its mooring, and with it, the device 15, at considerable vertical speeds, measured up to several meters/second. This may cause significant issues when using the device 15, such as creating significant flow noise from water passing by a hydrophone and its case, thereby masking other noises like whale vocalization noises or vibrations and rendering the device 15 useless except for times of calm seas. Repeated cycles of force also contribute significantly to mooring fatigue in the conventional system shown.

FIG. 1B depicts another buoy mooring system 20 for deployment in deeper water. In particular, FIG. 1B depicts a buoyant object 21 that couples a urethane chain 22 and a conductor cable 23 with a coupling to the device 25. The device 25 connects to a length of chain 24 below. This chain 24 is connected to a length of heavier than sea water plaited nylon rope 27, which is spliced into a length of buoyant polypropylene rope 28, forming what is often called an S-tether configuration in the ocean at calm conditions. The bottom end of the polypropylene rope 28 connects to a length of marine chain 26 resting on the ocean floor. The chain is coupled into an anchor to keep the mooring on station. A series of plastic floats 29 are tied to the bottom end of the polypropylene rope 28, allowing it to lift the top section of the chain off the sea floor to avoid abrasive sea floor contact of the polypropylene rope 28 end.

The system 20 depicted in FIG. 1B may move the device 25 and upper mooring elements up and down in sync with the surface waves, creating flow noise which masks the underwater noise or vibration signals and can compromise acoustic signal detection or make such detection impossible except under calm seas. Repeated cycles of force also contribute significantly to mooring fatigue in this and similar systems.

The invention described herein includes a highly compliant tension member for use in cyclically loaded marine systems (e.g., oceanographic buoys and/or mooring systems) that isolates the large vertical and horizontal excursions and motions at one end from the other (e.g., a surface buoy coupled to an anchor via the inventive tension member). The inventive stretch hose dampens and in many instances avoids the rapid vertical motions—known as vertical heave motions—which are extremely difficult or impossible to avoid using the buoy systems depicted in FIGS. 1A and 1B. These heave motions create a "whooshing" noise that swamps out other acoustic or other signals and are undesirable for underwater acoustic sensors, along with limiting the performance of other devices. Additionally, such heave motions strain conductors and cables integrated into traditional lines and moorings, decreasing fatigue life, and significantly reducing the conductor lifespan, as well as the lifespan of the overall line itself. In particular, and as described with reference to FIGS. 2-9, the invention employs a highly extendable reinforced elastomeric hose, which can accommodate a constantly changing distance between its two ends with minimal negative impact on its fatigue life. In another aspect, the inventive elastomeric hose provides more reliable embedded electrical conductors and/or data path linkages (i.e., copper cable, optical fiber guide, other data cable) between its two ends. Current and/or information flow in the inventive hoses may be either uni- or bidirectional.

Thus, the invention is particularly useful for connecting a buoyant object to an underwater anchored device (e.g., a sensor or power source), thereby more reliably enabling radio-links, satellite, or other transmission of acoustical, optical, and other sensor reception to shore stations, or transmission of sensor control commands from a shore station via the buoyant object. The combination of the system's increased load bearing and elongation abilities with a more reliable capacity to communicate its signals, including high speed data transfer, to or from shore reliably and optionally to a submerged entity, and the adaptation for high power marks the greatly improved utility of this buoy system to work as an effective device.

Figure 2:
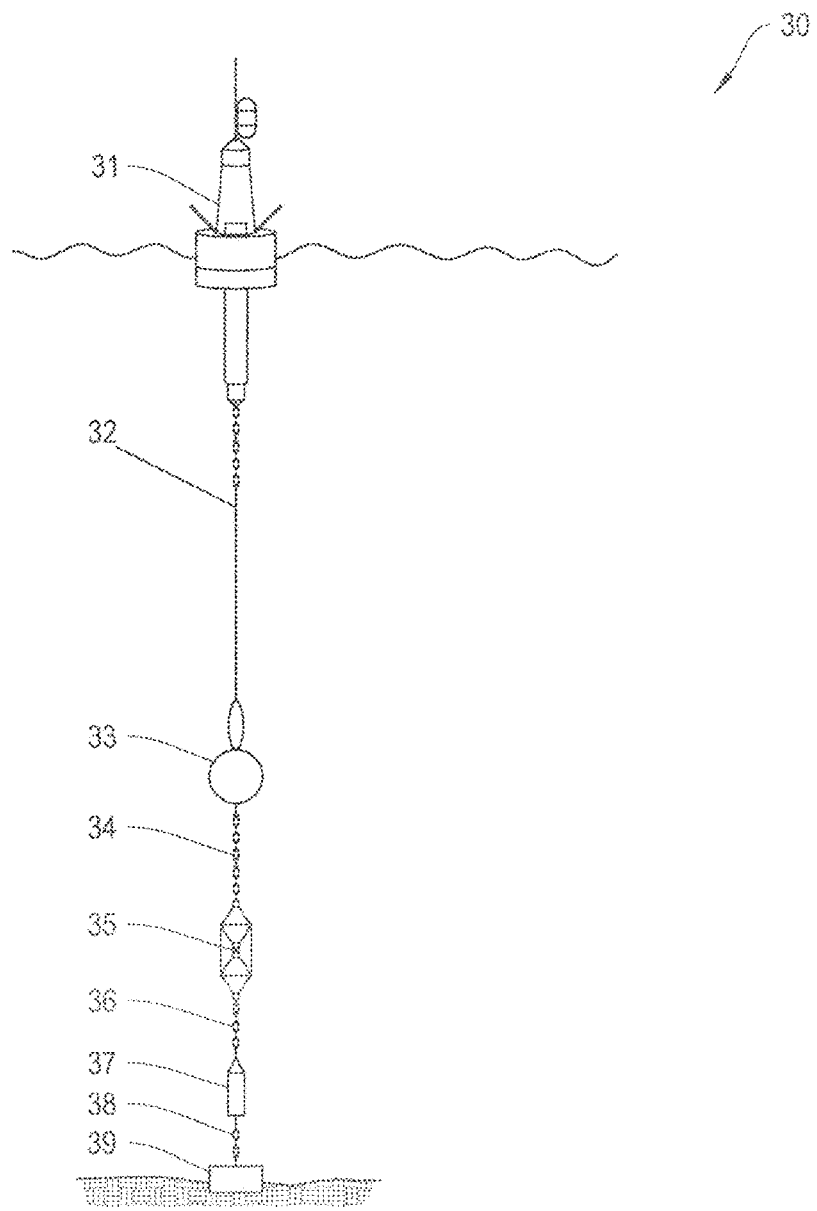
FIG. 2 depicts a buoy mooring have a stretchable hose, according to an illustrative embodiment.

FIG. 2 depicts a buoy mooring system 30 according to an illustrative embodiment. As shown, the device and cage 35 are positioned below the depicted subsurface buoy and connected to this depicted subsurface buoy 33 via a short urethane conductor chain 34 and an electro-mechanical cable. The connection between the buoyant object 31 and the subsurface buoy 33 is a stretch hose 32. In particular, the system 30 includes the buoyant object 31 connecting through a high stretch tire cord reinforced elastomeric hose 32 with embedded conductors to the device and cage 35, such as a CR series hydrophone, manufactured by Cetacean Research Technology, located in Seattle, Wash. Below a subsurface buoy 33 is a taut mooring to the anchor 39. The upper portion of this taut subsurface buoy mooring includes a potted chain length with an embedded conductor cable 34, which is connected at its lower end to the device and cage 35. Beneath the cage 35 is a chain section 36 which connects to a release device 37. The release device 37 separates the mooring from its anchor 39 and a chain section 38, e.g., through a coded acoustic signal from a ship, allowing easy recovery of the buoy system. Both chain 38 and anchor 39 may be left behind when the system is retrieved.

The length of stretchable hose 32 is selected to be sufficiently stretchable to allow the buoyant object to be carried over the highest ocean waves observed or expected at a selected location, which can be 10 meters or higher in completely exposed locations, or less in semi-sheltered areas of the ocean. To accommodate various water depths and vertical heave motions, the stretchable hose may be constructed of an unstretched length of 25 feet, 30 feet, 35 feet, 40 feet, 45 feet, or greater of equal to 50 feet up to 100 or several hundred feet or in some cases more.

The hose 32 changes in length, allowing the buoyant object 31 to ride up on the surface of these waves and transverse down the wave, reducing the pull of the buoy through the air/sea interface. The vertical heave upward and then the downward motion over the wave (i.e., wave action) is measured as a stretch cycle. This in turn reduces the amount of noise generated at the air/sea interface by the buoy 31 and background noise that can interfere with operation of the device (e.g., a hydrophone, seismometer, motion sensor). Furthermore, the hose changes in length while preventing stress on the embedded cables due to the rapid heave motions.

Also shown in FIG. 2 is the subsurface buoy 33, which in some embodiments may include a steel sphere. The subsurface buoy 33 couples to one end of the stretchable hose 32. The subsurface buoy 33 acts as a massive body that provides inertia to the system 30 and reduces the ability of the buoyant object 31 to move the lower end of the stretchable cable 32. In some embodiments, the subsurface buoy 33 tensions and stretches the lower mooring held by the anchor, and therefore is held in the same altitude above the sea floor. In these embodiments, the subsurface buoy 33 may serve as the quasi-fixed end of the stretchable cable 32, while the upper end follows the motions of the buoyant object 31. The conductor urethane chain 34 may be a short length of chain that couples the subsurface buoy 33 to the cage 35.

In some embodiments, the cage 35, or other appropriate structure (e.g., another hose segment) includes a sensor or array of sensors, and those with skill in the art understand that other instruments may be attached in place of cage 35 or hose to collect several kinds of data. Such sensors may measure aspects including salinity, irradiance, plankton analysis, respiration/dissolved oxygen content, pressure, nitrate concentration, radioactivity, pH, motion, and other parameters that may be of interest. Other instruments may include sonar devices, velocity meters, spectrometers, fluorometers, seismometers, power sources, AUV docking stations, or the like.

Below the cage 35 is a short length of mooring chain 36 coupled to a release element 37. In some embodiments, the mooring chain 36 is about 1.7 meters long, but may be any of a variety of greater and lesser dimensions (e.g., 0.5 m, 1 m, 2 m, 5 m, 10 m, equal or greater than 20 m). The release element 37, such as the one depicted in FIG. 2, may respond to an acoustic signal, an optical signal, or a timer release mechanism to release itself from the mooring chain 36 that couples to the sacrificial anchor 39. This allows for the release of the buoyant object 31 from the sacrificial anchor 39 and makes it possible to collect the device and/or the upper portion of the buoy mooring, along with any data that may have been stored therein. In certain embodiments, the cage 35 may include a hard drive or other memory system that is capable of collecting information generated by the device or other circuitry for processing and transmitting data. In some embodiments, the device is coupled to an amplifier that sends signals through electrical conductors in the stretchable hose 32 to the buoyant object 31. At the buoyant object 31, a set of transmitters may be provided that will transmit data representative of the current state of the surrounding marine environment (e.g., wind conditions, solar radiation, wave dynamics, weather, pressure) and presence of marine life in the local waters to a remote location. This data may be broadcast to ships in the vicinity, thereby providing a warning to ships in the vicinity of environmental conditions or mammal life, such as the presence of Northern Right whales. This can help local ships avoid striking the local wildlife. Further, the cage 35 may include a hard drive for recording all the data signals detected during a time period, such as one month or longer up to or greater than one year, during which the device is in operation. Thus, the buoy system 30 depicted in FIG. 2 may be periodically dropped by a research vessel and retrieved by activation of the release element 37 so that the data and instruments may be recovered. The system 30 in FIG. 2 can be one of several buoys that are set up in an area to provide area monitoring of marine animals, submarines, marine industrial operations, environmental conditions, or other underwater activities. The buoys can be set up over a large area so that a number of devices are positioned across the area of interest and may comprise capacities for communication between buoys or floating platforms.

In certain embodiments, the overall mooring length is kept shorter than the water depth at the site and the hose 32, once deployed, may be deployed in a pre-stretched condition. The pre-stretch may keep the entire mooring taut except for allowing a selected small amount of slack when the surface buoy rides through the trough of large storm waves. In other embodiments, the overall mooring length may be about the same or greater than the water depth at the site, but the bottom mooring segments of such systems may be subject to periodic and/or continuous abrasive sea floor contact. In certain embodiments, the length of the hose 32 and its stretch is selected to allow the surface buoy 31 to rise to the top of the highest ocean waves in a given location and to allow lateral mooring excursions caused by lateral drag resistance forces on the mooring and surface buoy 31 and wind drag forces on the buoyant object 31 without overstretching the hose 32.

The mooring forces and force fluctuations under normal and worst weather conditions at a selected mooring location may be determined with advanced time domain numerical modeling programs for a specific buoy system. Such programs generally predict the tensions at different positions along the mooring due to known or assumed current profiles. The tensile strength and stretching properties of the hose 32 are selected to support the maximum expected tensions/extensions of the system within its working load and working stretch range, taking into account a sufficient safety factor for long-term survival. The design and length of the hose 32 are selected to fit the mooring needs and optimize its performance, including its tensile strength and stretching capabilities. For example, a typical hose 32 may stretch to over twice its original length (i.e., 100 percent stretch) at its maximum working load. The tensions in other portions of the buoy mooring are also determined through the modeling process, thereby allowing selection of mooring hardware to support the mooring loads with sufficient factors of safety. The adaptable mechanical properties of the hose 32 allow optimization of the design and performance of surface buoy mooring systems to the local conditions (e.g., water depth, ocean currents, prevailing sea states, and wind) at a particular site. It will be understood by one of ordinary skill in the art that the systems and methods described herein can be modified for other suitable applications and that such other additions and modifications will not depart from the scope hereof.

Figures 3A, 3B:
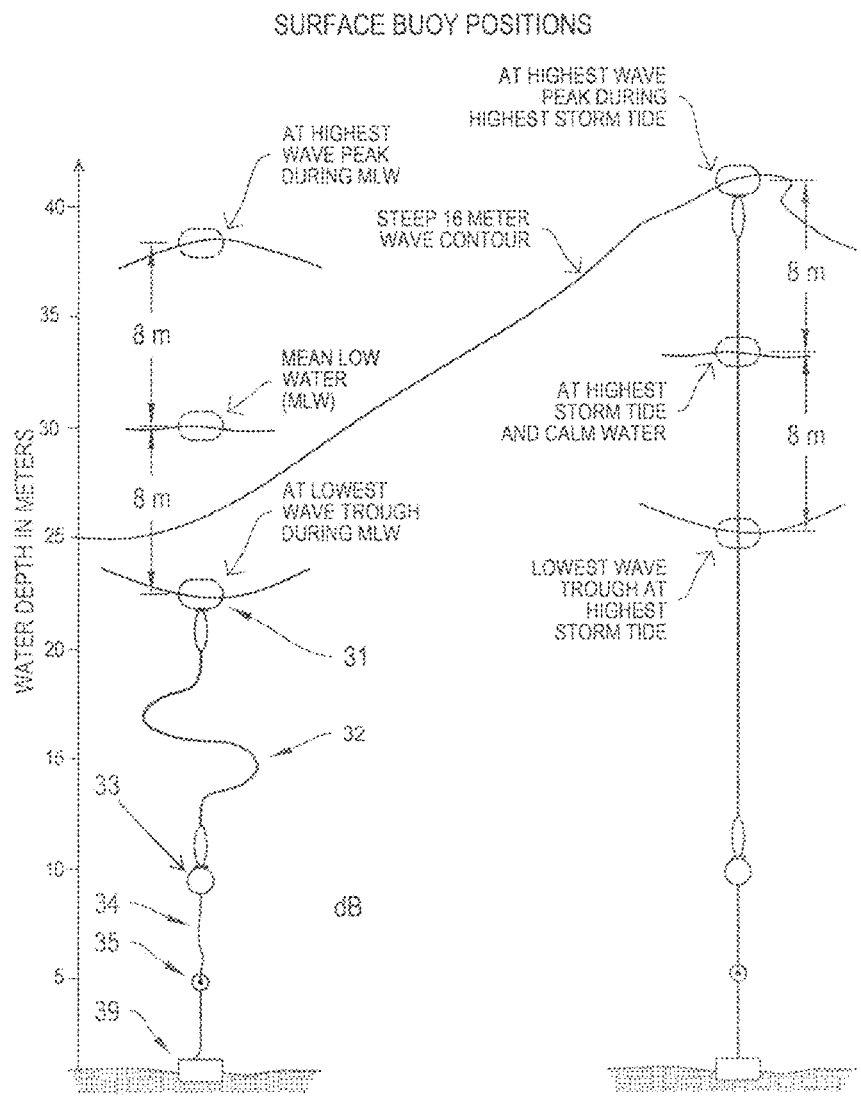
FIGS. 3A-B depict buoy moorings with stretchable hoses under varying wave conditions, according to illustrative embodiments.

FIGS. 3A-B depict buoy moorings with stretchable hoses, such as the buoy mooring described in relation to FIG. 2, under varying wave conditions, according to illustrative embodiments. FIG. 3A depicts a buoy mooring at different wave heights at a mean low water (MLW) level, and FIG. 3B depicts the buoy mooring at different wave heights at highest storm tide. In both cases, the length of the stretchable hose 32 is 15 meters.

In FIG. 3A, at the deepest wave trough, the buoyant object 31 drops 8 meters (26 ft) below the mean low water level. At this moment, the stretchable hose 32 has to accommodate the largest slack of 3 meters (10 ft), since the normally 15 meter distance between subsurface buoy 33 and buoyant object 31 is reduced to 12 meters. The stretchable hose 32 accommodates this slack by forming a loop as shown in FIG. 3A. Such loop formations can be tolerated by the stretchable hose 32, because its chance of kinking is very low. In comparison, electro-mechanical (EM) cables, wire ropes, and some fiber rope constructions often form permanent kinks or hockles under similar conditions.

At the mean low water level in FIG. 3A (not shown in detail), the subsurface buoy 33 floats 30 meters above the sea-floor. The 15 meter long hose 32 is stretched 5 meters, and develops about 37 percent center section elongation, resulting in about 200 lbs tension in the hose link. The overall hose stretch is lower (33 percent), since the extra-reinforced hose sections next to the couplings stretch less (All values in this section are approximate).

At the highest wave peak during MLW (not shown in detail in FIG. 3A), the wave crest and buoyant object 31 are 8 meters above MLW or 38 meter above the sea floor. The 15 meter long hose 32 is forced to become 28 meter long, or increases its length 18 meters (59 ft), develops about 95 percent stretch in its compliant section and a tension of about 550 lbs.

At the highest wave crest at high storm tide (FIG. 3B), the buoyant object 31 is riding the wave peak 11 meter (36 ft) above MLW or 41 meter above the sea floor. At this highest position the buoyant object 31 extends the 15 meter long hose 32 to 31 meter (101 ft) length, a 16 meter length increase or 107 percent overall hose elongation. This elongates the compliant center section to 118 percent. Under this stretch the hose tension is about 660 lbs, loading the nylon tire cords to less than 8 percent of their breaking strength. Even at the highest wave crest, discussed above, the hose 32 still has some stretch available, which allows lateral movement without overloading the hose 32. This horizontal movement might be forced by a passing wave crest and/or under ocean currents as a taut mooring.

Figure 4:
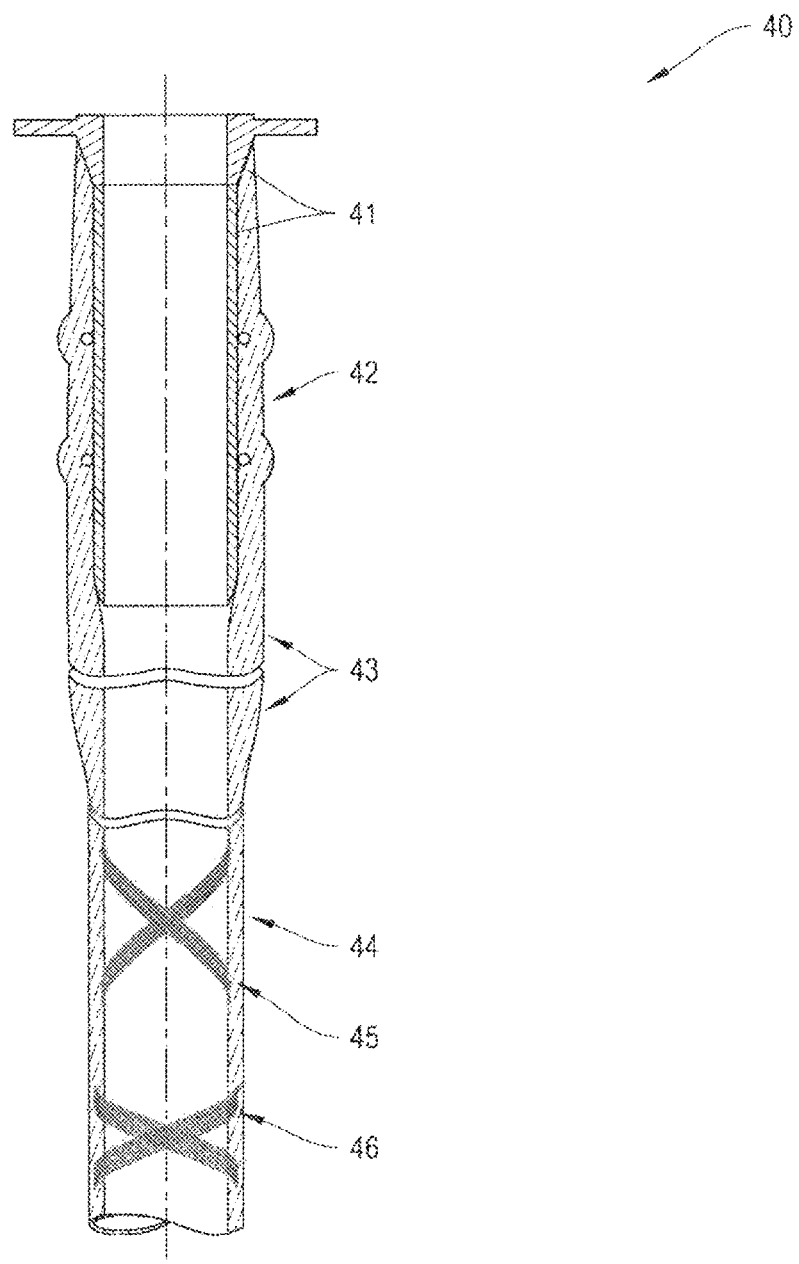
FIG. 4 is a cross-section view of a stretchable hose, according to an illustrative embodiment.

In some embodiments, the stretchable hose 32 includes a relatively long, high stretching center section, hose end couplings, and extra reinforced end sections next to each hose end coupling. Conductors, particularly those designed for high speed data transfer and/or high power, are embedded into the hose walls and arranged in a stretch neutral geometry or at a selected helical angle. FIG. 4 depicts a cross-section view of a stretchable hose 40 (similar to hose 32 in FIG. 2), according to an illustrative embodiment. The hose 40 includes an inner rubber liner, as part of the hose wall, one or more helically butt-wrapped layers of nylon tire cords serving as reinforcing strength members 45, one or several layers of electrical conductors and/or optical light guides, applied at a selected steep helical angle, and one or more helically wrapped protective layers of Kevlar® tire cord 46 to protect the hose against fish bite, also applied at a steep wrap angle or other suitable selected angle. In some embodiments, the hose 40 includes an outer reinforcement layer 44.

The hose design and its terminations as described herein is designed and built for the purpose of being a highly compliant strength hose and conductor carrier, not as merely a flexible conduit connection to transport materials, fluids, and gases. The strength hose comprises adaptable load elongation behavior, requiring the use of structural textile mechanics calculations to customize a hose design and closely predict its stretch, torque, and rotation behavior under load. A hose design is selected as a tension support member, not merely a stretchy fiber rope with incorporated conductors, or a non-stretching electro-mechanical cable. The hose 40 is to have substantially high stretch levels, e.g., approximately 100 to approximately 300 percent, to accommodate the ocean wave heave motion of a buoyant object within its working elongation in any water depth and allow a dependable way to accommodate embedded high power electrical and high speed optical or copper conductors wrapped at a steep helical angle into the hose body which function reliably despite the large stretch deformations of the hose body in use. Moreover, hoses for mooring applications should be strong enough to support significant mooring tensions (e.g., from less than 1,000 lbs to about 50,000 lbs or more). Table 3 illustrates many of the exemplary upper and lower bounds and common values of the stretchable hose apparatus, according to certain embodiments.

Hoses and other flexible connectors and/or tension members such as lines, cords, and ropes generally have inversely-related strength and stretching characteristics. For example, a connector/tension member that has a high breaking strength tends to stretch very little before breaking, whereas a connector/tension member that stretches a lot before breaking tends to have a low breaking strength. Table 1, below, tabulates some estimated breaking strengths and stretching characteristics for a number of flexible connectors/tension members.

TABLE 1

Breaking strength and stretch values at break and at maximum workload of buoy mooring elements.

| Mooring Element | Breaking Strength in lbs | Elongation in % at Break/Max. Workload |
|---|---|---|
| Rubber Tether* | ~500 lbs | Up to 500/200 |
| Rubber Hose | 2,000 to 20,000 lbs or multiple | Up to 200/170 |
| Nylon Rope* | 25-30,000 lbs | 30-50/10-20 |
| Wire Rope | 60-80,000 lbs | 1-2/1 or less |
| Kevlar/Vectran/ UHMW PE Rope | 80-120,00 lbs | 2-4/2 or less |

*Note:
Rubber tether and rope strengths are for 1" diameter size. Rubber hose outer diameter is typically 2" and larger for strengths above 4,000 lbs.

As Table 1 indicates, a tether made of a highly stretchable elastomeric material such as rubber is capable of elongating up to approximately 200 percent at maximum workload, or up to approximately 500 percent before breaking. Rubber can typically endure large stretch cycles for long periods of time without losing significant retraction capability. However, rubber is weak in tension; its elastic modulus up to this elongation is approximately 210 to 300 psi, and a 1" diameter rubber tether only has a breaking strength of about 500 lbs. A mooring tether would need to support typical mooring tensions approximately 1,000 to 10,000 lbs and in some cases up to 50,000 lbs or more without breaking. In contrast, a rope made from a para-aramid synthetic fiber such as Kevlar® has a breaking strength of approximately 80,000-120,000 lbs, but will only stretch about 2 percent at maximum workload, or 2-4 percent before breaking. Hence, a connector/tension member structure having both high stretchability and high breaking strength (e.g., a structure with the stretchability of rubber but a significantly higher breaking strength) is desirable for mooring applications.

Figure 5A:
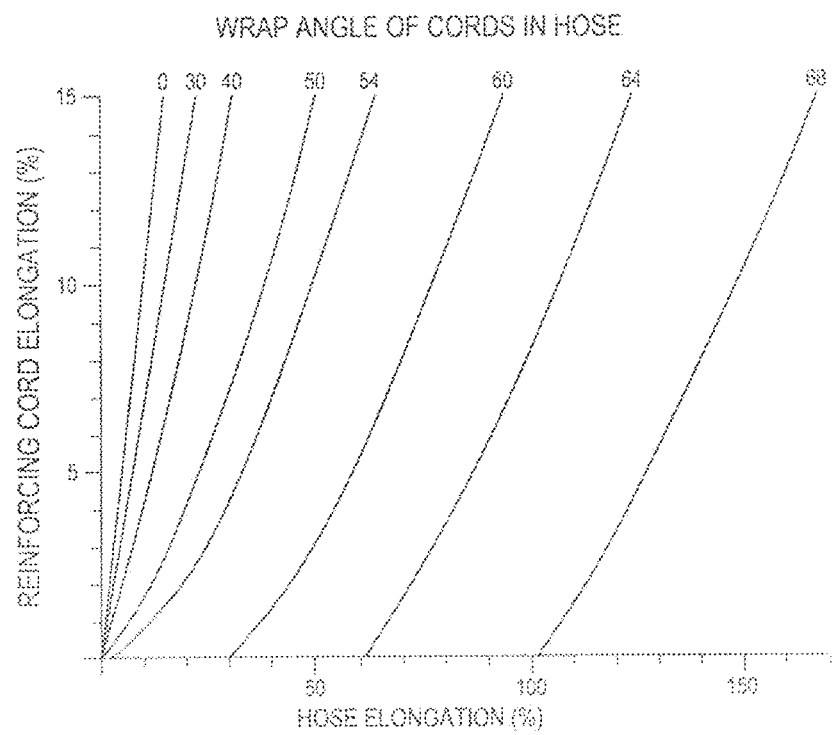
FIG. 5A is a chart depicting the relationship between reinforcing cord elongation, hose elongation, and reinforcing cord (i.e., strength member) wrapping angle, according to an illustrative embodiment.

FIG. 5A is a chart depicting the relationship between reinforcing cord elongation, hose elongation, and reinforcing cord wrapping angle, according to an illustrative embodiment. FIG. 5A shows the elongation of nylon tire cord strength members up to 15 percent in the elongated hose for different wrap angles of the helically wrapped strength member layers. (Note that the cords break at about 20 percent elongation, more than the 15 percent shown in FIG. 5A.) As the wrap angle becomes steeper, the hose elongation at which the tire-cords leave their buckled untensioned condition and start to pick up load become larger. In one instance, with a wrap angle of 60 degrees in, the cords pick up tension at 30 percent hose elongation, and will break when the hose has elongated 100 percent. When the wrap angle is selected as 68 degrees, the cords pick up tension at 100 percent hose elongation, reach their maximum workload at about 140 percent elongation, and fail the hose at about 180 percent elongation, since the cords have reached their breaking elongation at this point. In another instance, with a wrap angle of 70 degrees, the cords may allow over 200 percent hose elongation. FIG. 5A only shows the elongation of the reinforcing tire cords in the hose depending on the wrap angle of the strength member layers of a few embodiments. It does not show the rubber tension, reinforcement tension, and overall hose tension of a specific hose.

Figure 5B:
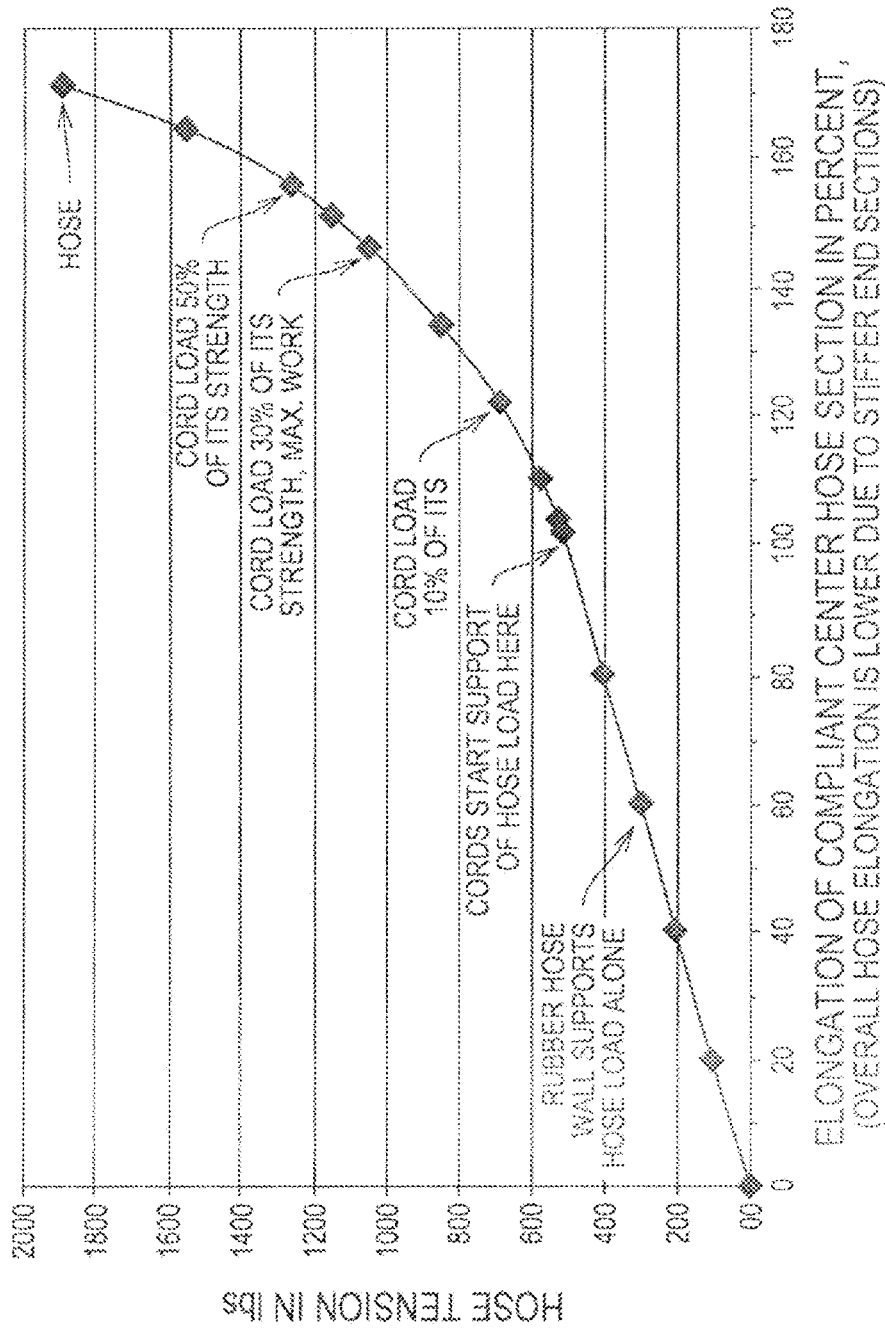
FIG. 5B is a chart depicting the stretching behavior of a stretchable hose, according to an illustrative embodiment.

FIG. 5B is a chart depicting the stretching behavior of a stretchable hose, according to an illustrative embodiment.

The stretchable hose depicted is designed to have approximately the following behavior through the geometry and construction of the strength member layers and stretch limiter layers and the load carrying cross section of the hose wall: in specific embodiments, at ~500 lbs tension, the hose stretches about 100 percent, and the tire-cords start to pick up tension. When the hose is stretched 140 percent (it has now nearly 2.4 times its original fabricated length), it may have stretched its nylon tire cord reinforcement to ⅓ of its breaking strength, and the hose tension is ~1,200 lbs. In other cases, at about 170 percent elongation, the calculated hose load passes 1,800 lbs. In preferred embodiments of the stretch hose, the hose may elongate to 100 percent, to over 200 percent, and up to 300 percent or more depending on the specific layering construction of the hose.

It is to be understood that the calculated load elongation behavior shown in FIGS. 5A-B are only approximate due to the time and elongation speed dependent loading and unloading response of rubber and textile tire cords; the tensile load and stretch response in addition depend on the hose's loading and storage history. Furthermore, preferred embodiments of the stretch hose are included which bear substantially more tensile load and/or stretch to a predetermined amount greater than embodiments shown in FIGS. 5A and 5B. In many constructions, the system bears about a 10,000 lbs tensile load and in some embodiments, up to at least 50,000 lbs. Improved constructions of the stretch hose typically elongate over 200 percent of original length and in some cases elongate up to or greater than 300 percent. Small manufacturing variations of tire cord strength and stretch behavior are amplified due to the tire cord's tightly spiraled arrangement in the hose wall. Varying wrapping angle tightness and angle allows for additional variation to the actual hose stretch response. The agreement between calculated and actual load-elongation behavior is fairly close and consistent. Hoses of this embodiment are typically deployed with approximately 15 to 30 percent pre-stretch in order to keep the mooring taut. When retrieved after 3 to 10 months at sea, the hoses may typically measure 15 percent longer than their as-built length; however, the hoses typically retract closely to their as-built length after a few days or weeks in storage on-shore.

In certain embodiments, the systems described herein may be configured as large hoses where the design strength reaches considerably higher strengths without reducing the stretchability and thereby the capability of such hose design to accommodate large wave excursions within its working stretch limits. In some embodiments, these hose designs support higher tension levels within their working stretch limits, thereby allowing the use of larger buoys or deployment of mooring systems in deeper water or areas with higher loads from stronger ocean currents. Such hoses may also be used in other offshore applications for wave or stretch mitigation.

Furthermore, the improved stretchable hoses of the invention demonstrate increased resistance to fatigue and deterioration due to cyclic stretching of the hose when deployed. When deployed in a marine environment, a stretchable hose may be subject to constant wave motions, creating many stretch cycles (i.e., vertical stretches and contractions of the hose). Typical ranges for a stretch cycle are about a 1 meter amplitude at a 4 second period to about a 10 meter amplitude at a 12 second period. The average stretch cycle may be close to a 2 meter amplitude at a 6 second period, which is 432,000 cycles per 30 day month. In some cases, the wave conditions are about 1 year of 6 second waves, wherein the hose may experience about 0.5 million stretch cycles per year, and over the course of a 2 to 20 year deployment, the stretchable hose may be adapted to survive 1 to 10 million stretch cycles or more.

In certain embodiments, the hose 32, used as a mooring tether for the buoy system 30 in FIG. 2, provides a combination of adaptable high stretchability and strength. The tire-cord reinforced rubber hose design of systems described herein provides this combination of properties and allows for incorporation of embedded electrical and optical conductor assemblies within its structure to produce a single current path from one end of the hose to the other. The hose design disclosed herein improves the survivability of embedded conductors after deployment in the ocean's difficult and dynamic surface wave zone. The conductor assembly's survivability is made possible by the stretch hose's arrangement of strength member and stretch limiter layers to manage the tensile loads and by the helical angle configuration of the conductor cables which do not stretch or compress the conductor lengths beyond their approximately 0.5 percent elastic elongation limit.

Figure 6:
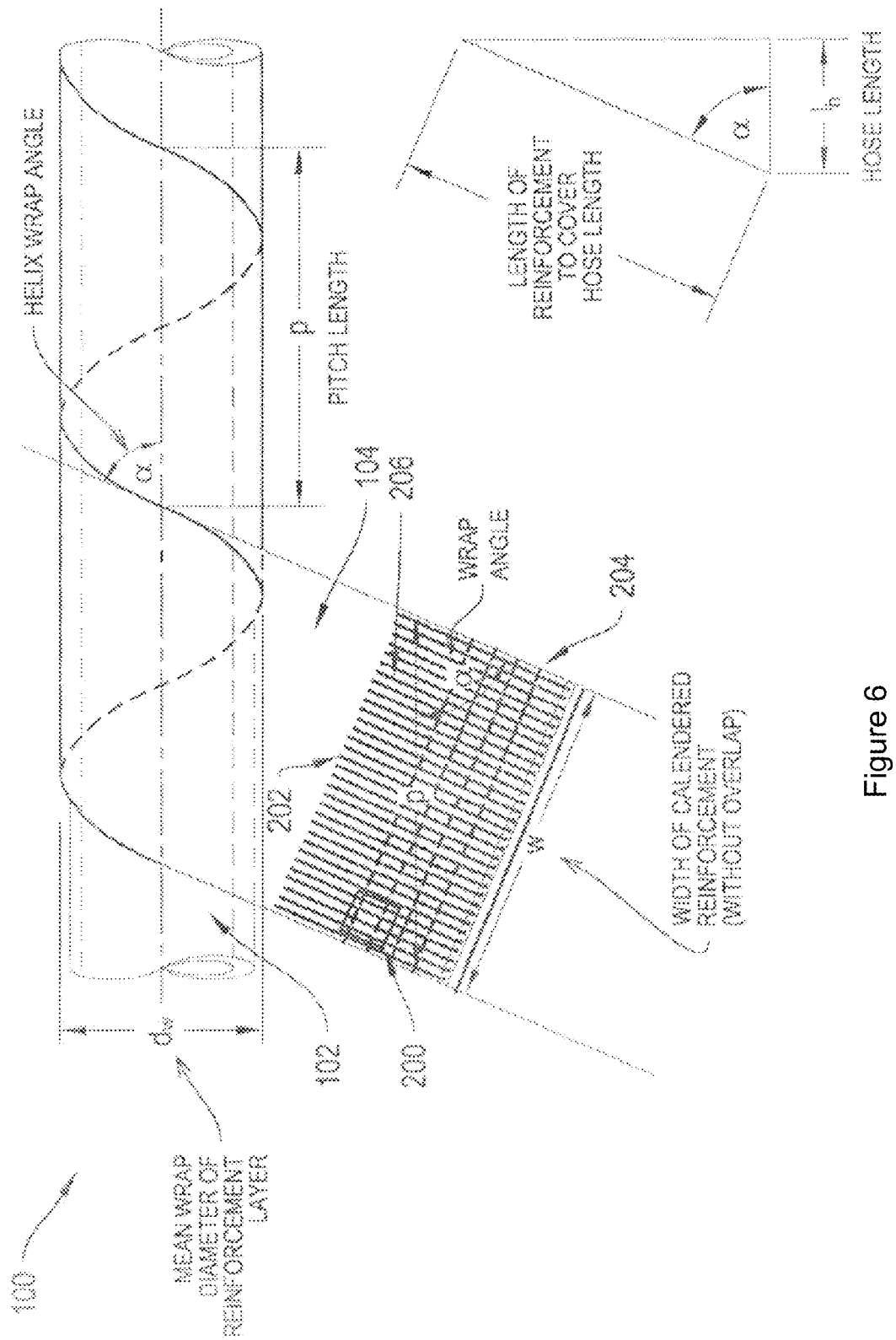
FIG. 6 depicts a diagram of a stretchable hose system, according to an illustrative embodiment.

The stretchable hose system is comprised of a plurality of layers and wrapping orientations including strength members, stretch limiters, reinforcement layers, and other suitable coverings such as additional rubber and protective layers. In certain embodiments, the stretchable hose includes an inner liner layer defining a central core (i.e., tube, cylinder), with an inner strength member layer set wrapped around the inner liner layer in a forward helical direction with a selected wrap angle to the axial direction of the inner liner layer core. FIG. 6 is a diagram of a stretchable hose system 100, according to an illustrative embodiment. The stretchable hose system 100 includes an inner liner layer 102 formed into a central core and a first strength member layer 104. The strength member 104 includes a series of reinforcing cords 202, a flexible matrix 206, and cross-woven structures 204. These structures are discussed in further detail with relation to FIG. 7, below, which depicts a portion 200 of strength member layer 104. In some embodiments, there may be one or more other liner layers or reinforcement layers wrapped over the inner liner layer 102 or between the strength member layers to provide further reinforcement or insulation.

Standard woven nylon tire cord fabric or any other polymer or polymeric composition with similar properties is generally used in a strength member to increase the tensile strength and limit the extension of a rubber mooring hose. A woven nylon cord construction for reinforcing tires and hoses has a breaking strength of about 1,000 lbs per inch width and is encapsulated in a thin rubber sheet (e.g., 206, FIGS. 6-7), typically but not limited to 0.032 inch thickness, to prevent uneven spacing of the loose weave and abrasion between cords. Its stress at break is about 31,250 psi, compared to 270-420 psi of rubber stress at 200 percent stretch. The weave comprises about 30 small parallel nylon cords (e.g., 202, FIGS. 6-7) per inch, kept in place and substantially evenly spaced by thin and weak cotton web yarns (e.g., 204, FIGS. 6-7) which are positioned typically about ½ inch apart. Woven cord with lower cord counts may also be used (e.g., 10 or less cord count, 15 cord count, 20 cord count, 25 cord count or more), if hose tensions have to be kept deliberately lower, or the cord size changed to accommodate different strength needs. An example of a woven cord fabric is shown in FIG. 7, discussed in further detail below.

The open woven reinforcing fiber cord "fabric", furnished with a rubber-friendly or other suitable adhesive coating developed for tire reinforcement, is embedded inside a thin rubber sheath, typically but not limited to 0.032 inch thickness. In some embodiments, the fabric is of a thickness greater than 0.032 inch up to 0.064 inch or thicker. The soft un-vulcanized rubber covers the fabric, and, in certain embodiments, encapsulates individual cords entirely, depending on the inter-cord spacing. For example, if the inter-cord spacing is large enough, rubber infiltrates between adjacent cords to encapsulate each individual cord entirely. The reinforced rubber sheath is sliced into ribbons of precise width, where the nylon tire cords run parallel to the ribbon length. These reinforced ribbons of reinforcing fiber cords form the main strength members of the hose, and in cases requiring additional strength and support, such strength members may be substituted in place of other hose layers such as stretch limiter or reinforcement layers.

Figure 7:
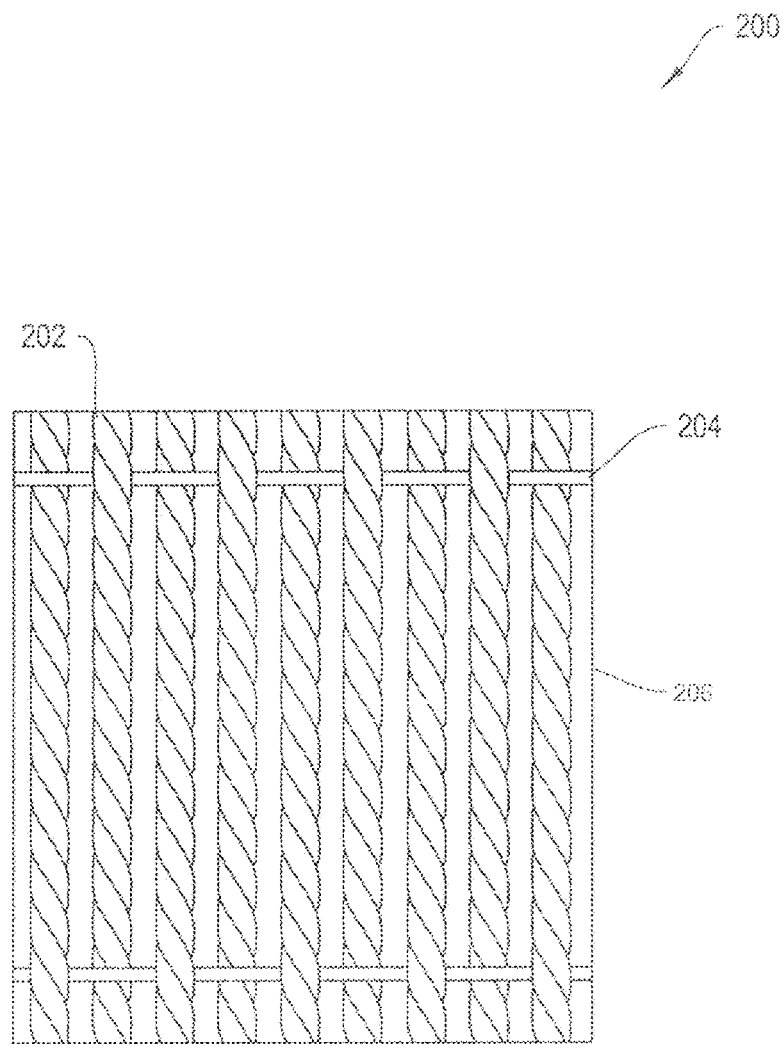
FIG. 7 depicts a portion of a reinforced strength member layer, according to an illustrative embodiment.

FIG. 7 depicts a portion 200 of the strength member layer 104 shown in FIG. 6. In some embodiments, each reinforcing cord 202 is not directly adjacent to neighboring cords, but rather is evenly separated from neighboring cords by a gap. Reinforcing fiber cords 202 are typically further linked by cross-woven structures 204, and disposed in a flexible matrix 206. Reinforcing cords 202 are flexible and able to stretch to some degree without undue damage to cord structure. For example, reinforcing cords 202 often comprise nylon tire cords, polyester tire cords, para-aramid synthetic fiber cords, or some combination of the foregoing or any other suitable cord, rope, cable, wire, or fiber. In some embodiments, the reinforcing cords 202 are made from industrial grade nylon fibers which stretch about 20 percent at break. In alternate embodiments, strength member layer 104 comprises multiple layers of reinforcing fiber cords 202. Cross-woven structures 204, fabricated of materials such as cotton weft or web yarn, are also flexible, and provide transverse support to reinforcing cords 202, as well as keep adjacent cords from touching in certain embodiments. The cross-woven structures 204 are woven in a direction perpendicular to the wrap direction over and under the reinforcing cords 202 to form a loose fabric. In some embodiments, the cross-woven structures 204 are designed to provide sufficient spacing for effective rubber encapsulation of the reinforcing cords 202. Flexible matrix 206 assists in forming the structure of the strength member layer 104, as well as providing structural and/or shape support for reinforcing cords 202 and cross-woven structures 204. The flexible matrix 206 also prevents inter-cord contact and/or cord-to-cord abrasion. In certain embodiments, flexible matrix 206 is formed at least partly from rubber, some other flexible or elastomeric material, or a combination thereof. In some embodiments, elastomeric materials such as latex, silicone, synthetic rubber, or polymers are employed in the stretchable hose to construct a flexible matrix of reinforcing cords 206. Other suitable materials include polyacrylate acrylic rubber, nylon, thermoplastic polyurethane, ethylene-propylene rubber, neoprene, Buna-N, ethylene propylene diene monomer (EPDM), butyl rubber, nitriles, styrene butadiene rubber (SBR), urethane rubber, fluoroelastomers, silicone, FKM, and any suitable elastomeric materials or combinations of materials known to one in the art. In some embodiments, the material for flexible matrix 206 is selected to provide high adhesion with the reinforcing cords 202 and/or the cross-woven structures 204.

In certain embodiments, each ribbon or layer is helically wrapped around the hose such that it does not overlap with itself or form gaps between subsequent wraps. Such a wrap is known as a butt-wrap and allows for maintaining the selected wrap angle with close tolerance. In some embodiments, this process is done by an operator or ribbon supplier moving along the rotating mandrel (e.g., by walking or on a moving platform or carriage) and supplying the strength member layer 104. The movement rate (i.e., horizontal displacement per revolution of the mandrel) of the operator or ribbon supplier is adjustable so that the helical wrap angle of the served ribbons or strength member layers can be controlled. For a given diameter of the underlying hose body and a given ribbon width, the wrap angle of the cords ribbons is maintained with close tolerance. In certain embodiments, the strength members are butt-wrapped helically around the inner rubber hose liner or already applied cord layers (e.g., FIG. 6). The butt-wrap of a ribbon of known width over a known diameter of the underlying hose body gives a substantially constant wrap angle with close tolerances. Suitable ribbon widths of the strength member are generally between 1 and 2 inches, but may include widths less than 0.5 inches up to 1 inch, up to 1.1 inches, up to 1.2 inches, up to 1.4 inches, up to 1.6 inches, up to 1.8 inches, or equal or greater than 1.9 inches. In additional embodiments, such ribbons are of a width up to 2 inches, 3 inches, 4 inches, or greater or equal to 5 inches.

In certain embodiments, the larger the wrap angle of the reinforced ribbons such as the strength members or other layers, the higher their structural elongation, or the easier the ribbon is to extend (like the slinky effect of a telephone handset cord), and the assembly can be elongated more at a selected tension. However, this comes at the price of a lower contribution of the ribbon's strength to the hose strength due to the steep angle of the tire cord axes to the hose axis. If, alternatively, the strength member helical wrap angle of the ribbons relative to the hose axis is lowered, and the ribbons wrap around the hose body closer to the direction of the hose axis, they contribute a significantly higher portion of their strength to the hose load. However, this helical ribbon configuration contributes only a small amount of structural elongation and thereby reduces the overall hose elongation available. Taking these aspects into consideration, preferred embodiments employ the strength member layers wrapped at angles (as shown in FIG. 6.) typically but not limited to about 70 degrees; other embodiments are wrapped at angles between about 60 degrees and 85 degrees, less than 80 degrees, less than 70 degrees, less than 65 degrees, less than 60 degrees, down to angles of 50 degrees or less to allow for less elongation. In other cases, the strength members are wrapped at angles greater than 70 degrees to increase the elongation capacity of the hose wherein the wrap angle is up to 72 degrees, up to 74 degrees, or up to or greater than 80 degrees up to 90 degrees.

If higher strength at a required elongation—or wrap angle—is needed, additional layers of rubber covered reinforced ribbons (i.e., strength members) can be added at the same wrap angle, or a larger hose diameter can be selected. In some embodiments, the overall stretch for a mooring in a given location is obtained by increasing or shortening the hose length, in addition to modifying the number of strength member layers and the strength member wrap angles of the hose.

The helical geometry of the reinforcing tire-cord ribbons together with the known load-elongation properties of the cord material and rubber material allows the determination of the hose load elongation behavior. In certain embodiments, the steeper the wrap angle of the tire cord ribbon layers, the more structural elongation is added to the overall stretch of the cords under applied loads, and the greater the support contribution required of the hose wall to manage the hose tension under hose stretch. At wrap angles below an angle of approximately 54 degrees—called the stretch neutral angle—both reinforcing cords and the stretching rubber wall supports the applied tension from the start, and no tension is applied to conductors (i.e., conductor elongation is zero). At wrap angles above the stretch neutral angle, the cord path initially shortens due to the diameter contraction of the stretching hose, the cords buckle as prone to negative elongation until a wrap angle dependent extension is reached. Therefore, one in the art would consider it optimal in some cases to utilize such a stretch neutral angle (i.e., a stretch neutral geometry). Up to this extension, the hose tension is entirely supported by the stretching rubber hose wall. Above the 'rubber only' stretch zone, the strength member layers additionally support the tow loads and eventually dominate the load sharing with the rubber wall.

The multi-layered stretchable hose apparatus generally comprises two sets of strength members, each set comprising at least one strength member layer 104. The first strength member layers (i.e., the inner strength member set) wrap around the exterior of inner liner layer 102 in a forward helical direction at a selected wrap angle, as shown in FIG. 6 and in the illustrative embodiment of Steps 1 through 6, Table 2. The first strength member layer set runs continuously from one end of the hose end to the other end, and transfers its tension to hose couplings at each end. The selected wrap angle, and other wrap angles, is measured between the longitudinal direction of the strength member layer 104 and the axial direction of the tube formed by the inner liner layer 102, or the hose axis. The first wrap angle determines in part the stretching characteristics of the stretchable hose system 100 and/or the hose breaking extension, and is discussed in more detail in relation to FIG. 5. If a wrapping angle of zero is used, where the strength member layers 104 and reinforcing cords 202 are parallel to the hose direction, the stretching behavior of the hose may be limited by the stretch at break of the strength member layers 104 and cords 202. As the wrap angle increases, the stretching characteristics of the hose system change as a function of the combination of at least the inner liner layer 102 and the strength member layer geometry. As previously discussed, the strength member helical wrap angle and other strength member layer 104 wrap angles is typically about 70 degrees, but in other embodiments wrap between about 60 degrees and about 85 degrees.

The inner liner layer 102, as mentioned above, is fabricated from flexible and stretchable rubber or elastomeric materials selected to be compatible with the selected fill fluid in its use. The hose, in some embodiments, is filled with water or other suitable fluid or gas within the central core when in service to prevent hose collapse under hydrostatic pressure. In other embodiments, the inner liner layer 102 comprises a solid central core or does not fill with fluid. The inner liner rubber compound is selected to provide compatibility with water (e.g., seawater, fresh water) and with sunlight. Strength member layers 104 and reinforcing fiber cords 202 are fabricated from a flexible material that is less stretchable than the materials used in the inner liner layer 102, the flexible matrix 206, and the outer liner rubber compound, but significantly stronger. Thus, the angle at which the strength member layers 104 and reinforcing cords 202 are wrapped around inner liner layer 102 (or other rubber layer) determines in part the overall stretching characteristics of the stretchable hose system 100.

Additional strength member layers are generally wrapped around the first strength member layer 104 to comprise the inner strength member set and to meet load bearing and/or elongation requirements of the stretch hose in Steps 3 to 6, Table 2. In certain embodiments, at least two strength member layers are applied to meet adequate strength requirements, most often both strength layers being wrapped in the same forward direction. In cases where two or more strength members are applied to the hose sequentially, the layers are often in an offset configuration, referred to as overlapping convolutions, wherein a suitable amount of overlap exists between layers to add sufficient frictional grip of the previous layer. Each layer overlaps and offsets the previous layer of ⅝ inch, in some constructions. In cases of where a stretchable hose requires less elongation, the each layer is offset by less the ⅝ inch to ⅛ inch or less. Conversely, in hoses desired to comprise higher elongation, each layer is offset by more than ⅝ inch to 1 inch, up to 1.5 inches, up to 2 inches, or up to or greater than 4 inches.

A first binding wire is layered after the first set of strength member layers (between Steps 6 and 7, Table 2) as a binding means. As the hose stretches under applied tension, the wrapped layers try to pull out of the hose coupling. For this reason, the binding means is applied in the area adjacent to and/or within the hose end engaged with the coupling to secure the end of the stretchable hose with the coupling, provide more reinforcement, reduce hose elongation near the coupling, and pack and secure the layers tightly between the binding wire wrappings to prevent the stretch hose from disconnecting from the coupling. The binding wire is generally comprised of metal wire of a suitable gauge including steel, stainless steel, titanium, copper, aluminum, metal alloy, or the like although other materials of appropriate strength may also be considered such as plastics or other polymers. In some cases, the binding wire is comprised of a single strand, but in other embodiments is comprised of multiple strands in a straight or twisted configuration. In additional embodiments, the binding wire layer is a mesh or matrix of wire cords.

The stretchable hose system 100 is a matrix of strength member layers, stretch limiter layers, and reinforcement layers that is selected to result in hose elongations at break between about 40 percent of its original length to about 300 percent of its original, unstretched length. As the incorporated strength member layers add stiffness and force-resisting aspects to the inventive hoses, stretch limiter layers further characterize the elongation capacity of the hose in combination with the stretch member layers. These layers are generally comprised of elastomeric material, and in preferred embodiments also comprise reinforced fiber cords to enhance stretch limiting capacity. Stretch limiters reduce the hose stretch under load to a minimum particularly in the region connecting the hose body to the hose end coupling. Additionally, the stretch limiters allow the stretchable hose to withstand the bending and stretching forces applied when in use. Stretch limiter layers are then applied over the inner strength member set (and the binding wire layer, in some embodiments). In most embodiments, the stretchable hose apparatus comprises two stretch limiter sets, each further comprising at least one stretch limiter layer, but preferably more than one layer, often wrapping over regions of the hose near the couplings (Step 7 to 17, Table 2). A first stretch limiter set is applied comprising a range of layers from a high stretch limiting layer (i.e., the stretch limiter wrapped at the steepest wrap angle) to a low stretch limiting layer (i.e., the stretch limiter wrapped at the lowest wrap angle) wherein the highest stretch limiter is first applied over the previous hose layer in a forward helical direction or in the same direction as the last strength member layer. Additional stretch limiting layers are then after applied sequentially down to the lowest stretch limiter most often in the same wrapping direction (Steps 7 to 10).

In some embodiments, the first stretch limiter set is wrapped in the same wrap direction but at shallower or decreasing wrap angles than the preceding layers. For example, the first strength member layer set may be wrapped at a wrap angle of about 70 degrees to the cable axis, and the stretch limiter layers then wrap at a stretch limiter helical wrap angle or angles less than 70 degrees and decreasing angles thereafter. This provides a section of gradually decreasing stretch of the hose and near and at its couplings. In certain embodiments, each successive layer of the first stretch limiter set is wrapped at a stretch limiter helical angle less than that of the previous layer as shown in Steps 8 through 10, Table 2. The stretch limiter helical angles generally range between about 25 degrees to 75 degrees. In a specific embodiment, the wrap angle decreases by about 10 degrees with each successive stretch limiter layer. Additionally, the ribbon width of the stretch limiters is most often increased with each successive layer, as illustrated in Table 2. However, some embodiments employ a series of stretch limiter layers of equal ribbon width.

One or more stretch limiter layers wrapped straight is often applied in Steps 11 and optionally 12, followed by application of a reinforcement layer interposed between the two stretch limiter layer sets (Step 13). This reinforcement layer is most often comprised of rubber or suitable elastomeric material to add sufficient frictional grip of the previous layer and is wrapped at a forward helical angle greater than the previous stretch limiter layer. Suitable elastomeric materials include natural rubber, synthetic rubber, latex, silicone, tetrafluoroethylene, ethylene propylene diene monomer (EPDM), polyacrylate acrylic rubber, thermoplastic polyurethane, neoprene, Buna-N, butyl rubber, nitriles, FKM, polymer yarn (e.g., nylon yarn, polyester yarn), and any suitable elastomeric materials known to those in the art. Suitable ribbon widths are include less than 0.5 inches up to 1 inch, up to 1.1 inches, up to 1.2 inches, up to 1.4 inches, up to 1.6 inches, up to 1.8 inches, or equal or greater than 1.9 inches. In additional embodiments, such ribbons are of a width up to 2 inches, 3 inches, 4 inches, or greater or equal to 5 inches. In a specific embodiment, the reinforcement layer is about 4 inches in width. The reinforcement layer is typically but not limited to 0.064 inch thickness. In some embodiments, the ribbon is of a thickness less than 0.032 inch up to 0.064 inch or thicker.

A second stretch limiter set comprising one or more stretch limiter layers is generally wrapped in a counter helical direction around the rubber reinforcement layer to achieve torque balance (Steps 14 to 17, Table 2). Such layers are most often applied in a reverse order proceeding from the lowest stretch limiter layer up to the highest stretch limiter layer wrapping in a counter helical direction (i.e., in the opposite direction of the first set of stretch limiters) and at sequentially increasing wrap angles with each layer. The stretch limiter helical angles range between about 25 degrees to 75 degrees. In a specific embodiment, the wrap angle increases by about 10 degrees with each successive stretch limiting layer. With each successive layer, the ribbon width of the stretch limiter decreases, providing the last stretch limiter layer with a narrower ribbon which may be of equal width of the first stretch limiter layer of the first stretch limiter set. Following the last stretch limiter layer, a second binding wire is added in the same manner as the first binding wire (between Steps 17 and 18).

A second set of strength member layers, referred to as the outer strength member set, is generally wrapped around the inner rubber tube, first set of strength member layers, and stretch limiting layers, most often in the counter helical direction of the first set of strength member layers to further provide tensile strength (Steps 18 to 21, Table 2). The wrap angle of the second strength member layer is usually the same as the first strength member layer but may differ depending upon the desired stretch characteristics of the final hose system, and may be adjusted by changing the operator/ribbon supplier movement rate. In some embodiments, the second series of strength member layers are applied to the hose in an opposite helical direction and most often at a larger strength member helical wrap angle than the last stretch limiter layer. As described above for the application of the first set of strength members, the layers may be wrapped offset from the previous layer wherein a suitable amount of overlap exists between layers to add sufficient frictional grip of the previous layer. Each layer overlaps and offsets the previous layer by about ¾ inch. In cases of where a stretchable hose requires less elongation, each layer is generally offset by less the ¾ inch to ⅛ inch or less. Conversely, hoses desired to comprise higher elongation may be offset by more than ¾ inch to 1 inch, up to 1.5 inches, up to 2 inches, or up to or greater than 4 inches.

In some embodiments, the helical wrapping directions of successive strength member or stretch limiter layers are alternated, with odd-numbered layers (first, third, fifth, etc.) wrapping in one direction and the even-numbered layers (second, fourth, sixth, etc.) wrapping in the opposite direction. Alternate embodiments include helical wrapping directions that do not alternate with successive layers, or alternate in some other fashion. In certain embodiments, one or more reinforcement separation layers is applied over the first, second, or subsequent strength member or stretch limiter layers. These reinforcement layers are made of rubber or other suitable elastomeric material and may separate consecutive layers.

After the application of the last strength member layer, a third binding wire layer is applied, in some embodiments, in the same manner as the first and second binding wires (as illustrated between Steps 21 and 22, Table 2).

After application of the second set of strength member layers (and in some embodiments, a third binding wire layer), conductor cables are optionally applied onto the hose body as illustrated in Steps 22 to 26, Table 2. In addition to supplying the stretchable hose with high power carrying capacity and/or high speed data transfer, i.e., high-throughput, the conductor cables also tend absorb a certain fraction of mechanical stress and stretch forces applied on the hose during use to provide additional stiffness without compromising the stretch characteristics of the hose.

The conductors cables used may be capable of either or both high-throughput power (e.g., up to 1 kilowatt, up to 1 megawatt, up to or greater than 2 megawatts) or high-throughput data (e.g., megabit Ethernet, gigabit Ethernet, DSL), hereafter collectively referred to as high-throughput. These signal and/or power conducting cables are also helically wrapped around the hose body within the hose wall (i.e., within the plurality of layers). In some embodiments, the conductor cables are wrapped in between successive reinforcement separation layers, and/or wrapped around the hose just within the protective layers of the reinforced outer jacket. The conductor cables are preferably helically wrapped with wrap angles large enough such that even at full hose extension, the conductors are not damaged by exceeding their approximately 0.5 percent elastic elongation limits. These steep wrap angles often differ from the wrap angles used for the strength member and reinforcement layers, but in some embodiments, the wrap angles are chosen to be within about 10 degrees of the strength member helical angle. In some embodiments, the conductor cable wrap angle is between or near 40 degrees, 45 degrees, 50 degrees, 55 degrees, 60 degrees, 62 degrees, 64 degrees, 66 degrees, 68 degrees, 70 degrees, 72 degrees, 75 degrees, and/or equal or greater than 89 degrees relative to the hose axis. In other embodiments, the conductor cable wrap angle is less than 40 degrees. In specific embodiments, the steep wrap angle is a minimum of 64 degrees and a maximum of 84 degrees, but is typically an angle between 70 and 76 degrees. In a specific embodiment, the conductor cables wrap at steep wrap angles near 74 degrees.

As mentioned above, in certain embodiments, the stretchable hose apparatus may include multiple conductor cables wrapped around the hose body within the plurality of layers. The inventive stretch hose provides an improved conductor cable wrapping configuration by wrapping the cables at a wrap angle which more efficiently utilizes the hose volume and results in a smaller diameter hose while still properly insulating each cable. The improved configurations of the inventive stretchable hoses allows them to accommodate increased overall tensile load capacity than previous stretchable hose models and standard constructions thereby decreasing or eliminating tensile load from embedded conductor cables and enabling the cables to be wrapped at steeper angles than the stretch neutral wrap angle as known to those in the art. In addition, wrapping the conductor cables at the steeper wrap angle allows for hose configurations for greater stretch capabilities.

Figure 8A:
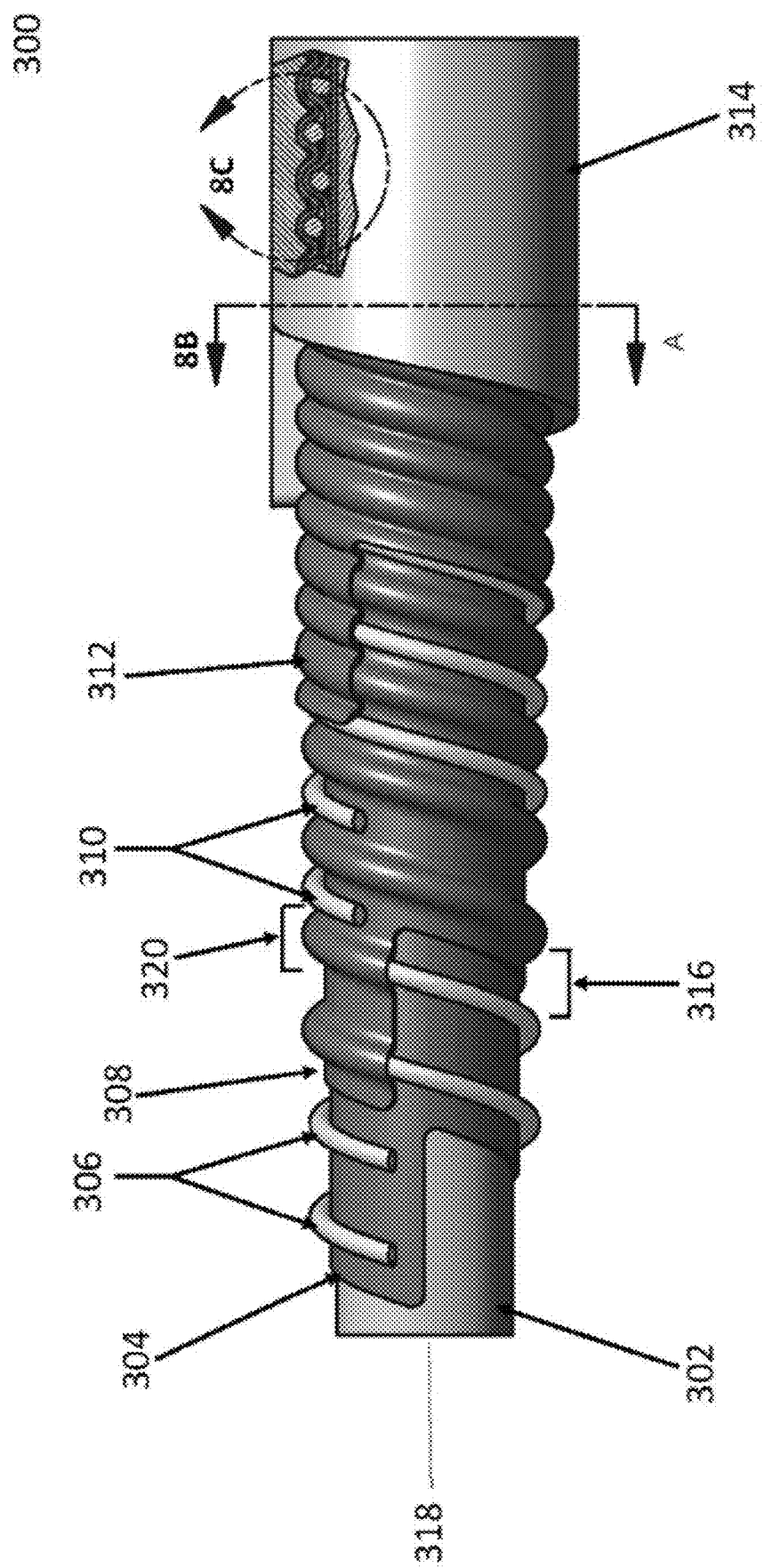
FIG. 8A depicts a side view of a stretchable hose, in accordance with one embodiment of the invention.
Figure 8B:
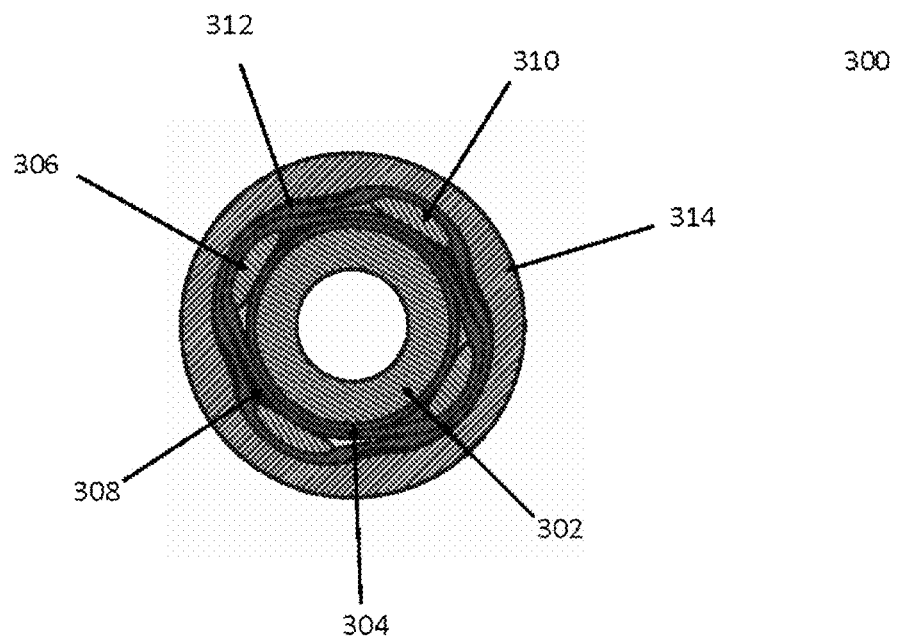
FIG. 8B depicts a cross-sectional view of a stretchable hose with embedded conductor cables, in accordance with one embodiment of the invention.
Figure 8C:
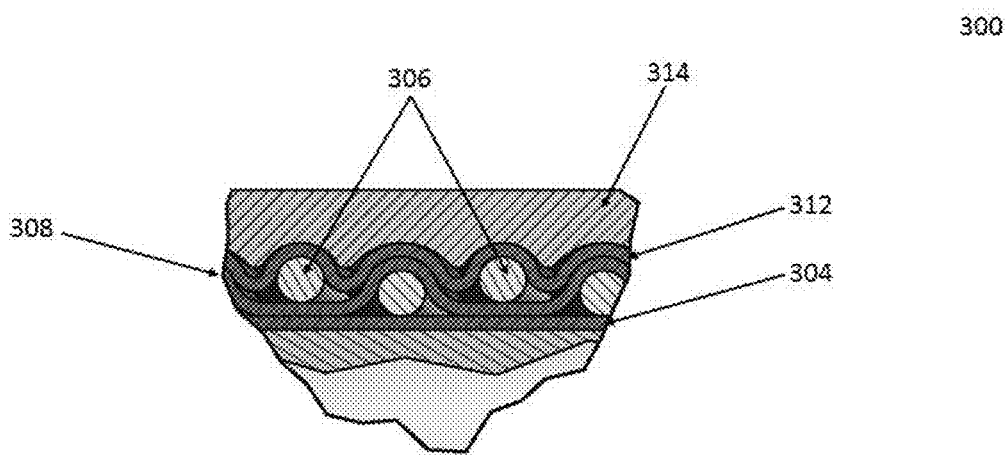
FIG. 8C depicts a cross-sectional view of exemplary embedded conductor cables with the hose wall, in accordance with embodiments of the invention.

FIGS. 8A-8C depict another embodiment of a conductor cable incorporated into a stretchable hose 300. While the high-throughput hose 300 may have many similarities to the stretchable hose 32 and the hose system 100, including having an inner liner layer, strength member layers, stretch limiter layers, and reinforcement separation layers, the improved hose 300 is particularly adapted for containing a cable or cables for high-throughput data, communications, and/or power. As depicted in FIGS. 8A-8C, the high-throughput hose 300 optionally comprises multiple cables (e.g., two or more, up to as many as ten or more cables) helically wrapped between the plurality of layers comprising the hose body wherein the cables are secured within and insulated by forward wrapped reinforcement layers. To form the cable layers of the hose 300, the first cable layer 306 is helically wrapped around a reinforcement layer, herein referred to as the conductor bedding layer 304. The conductor bedding layer 304, is wrapped over the full length of the hose in a forward helical direction over the previous hose layers 302, or most often in the opposite wrapping direction of the last strength member layer (Step 22, Table 2).

The first cable layer 306, comprising one or more conductor cables, is wrapped in a counter helical direction to the conductor bedding layer 304 at a selected wrap angle relative to a cable axis 318, in some cases, at a larger helical angle that the bedding layer 304 (Step 23, Table 2). A reinforcement layer referred to as the conductor spacer layer 308 is provided on top of the first cable layer 306, which forms a layer having a first helical ridge 320 corresponding to the location of the first cable 306 (Step 24). The space between the first helical ridge 320 at any point along the hose 300 is considered a helical valley 316. The conductor spacer layer 308, wraps in a forward helical direction around the first cable layer 306 over the length of the hose 300. A second cable layer 310, comprising one or more conductor cables, then wraps counter helically at a selected helical angle around the conductor spacer layer 308 adjacent the first helical ridge 320 (e.g., in the helical valley 316), illustrated in Step 25 in Table 2. The process of applying a conductor spacer layer on top of the most recently laid cable to form additional helical ridges and valleys may be repeated over and over again, such that it is possible to create a hose 300 with as many, or even more than, ten helical ridges and ten cable layers. As previously mentioned, some embodiments allow for each cable layer to comprise two or more cables laid down in spaced intervals within the same cable layer at a selected helical angle to form helical valleys to lay the next cable layer within. The final conductor cable is insulated with a reinforcement layer, the conductor cover layer 312, helically wrapped in a forward direction, further securing all wrapped cables prior to the application of the reinforced outer jacket 314.

As can be seen in FIG. 8C, this arrangement allows for radial overlap of the first cable layer 306 and the second cable layer 310, while maintaining the conductor cables in separate layers. By radially overlapping the conductor cables, the diameter of the hose 300 is less than would be expected were the hose 300 made with standard constructions. This allows for increased conductor cross-sectional area in the hose (resulting in more power and/or communication through-put) while maintaining a manageable hose diameter.

To permit compression of the conductor cable (e.g., 306, 310) when the high-throughput hose 300 is in a first range of extension (e.g., during narrowing of the hose 300) and to limit total elongation of the conductor cable in a second greater range of extension (up to full hose extension), the conductor cable follows a helical path relative to the central axis (defining a steep wrap angle) within the sidewall. The conductor cable arrangement assists in preventing buckling of the conductors, particularly during the first range of extension of the hose 300. Stretching may also be limited by insulating the cable with reinforcement layers. The reinforcement layers are usually in opposite directions to the cable to reduce twist of the hose 300 under load. The wrap angle of the conductor cable 306 is most often greater than the wrap angles of the stretch limiter and the strength member layers. This ensures that the conductor cable path length does not elongate during the normal operation of the hose.

Optionally, the stretchable hose system 300 may include a second, third, fourth, and other additional reinforcement layers similar to the layer that wraps helically around the first cable layer 306 and/or other cable layers. This helps prevent abrasive damage between contacting layers of opposite twist directions. The conductor reinforcement layers around which the conductor cables are wrapped are constructed from natural or synthetic rubber or other previously mentioned materials suitable for the reinforcement layers. In all of the above embodiments, the wrap angles are usually the same across all reinforcement layers, but in some cases vary individually, in order to achieve the desired stretching characteristics and/or to form a hose body with minimum rotation and torque development under load. Optionally, the number of reinforcement layers used may vary across the length of the hose system. For example, additional reinforcement layers may be used near hose couplings in order to provide more reinforcement at the coupling points. This helps the hose body resist damage due to friction with hose coupling components, by reducing the hose elongation near the coupling components. A final reinforcement layer is applied after the last cable layer as a conductor cover layer in Step 26 of Table 2.

Figure 9:
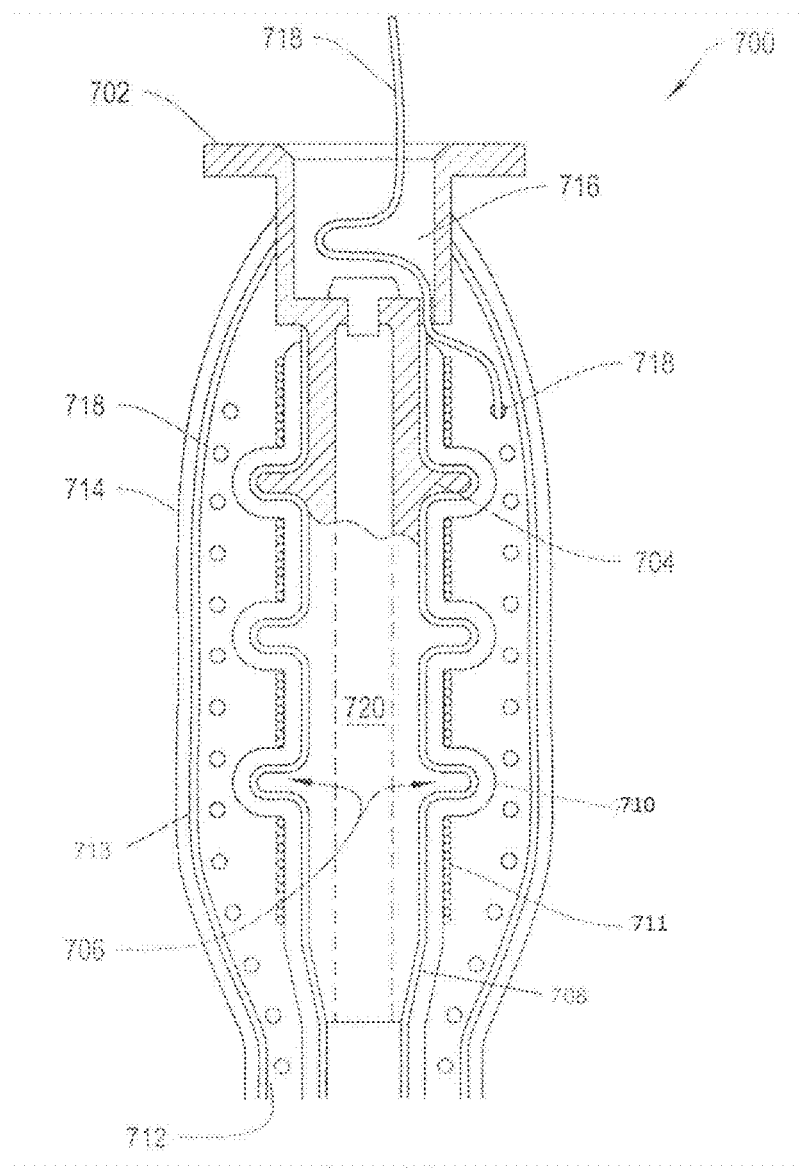
FIG. 9 depicts a cross-section of a hose coupling, according to an illustrative embodiment.

As shown in FIG. 9, the conductor cables 718 embedded as cable layers in protecting rubber reinforcement layers 712 are helically wrapped around the strength member layers 710. The helical wrapped design allows the conductor cable to resist the strain and stresses applied during stretch cycles and reliably conduct communication and data transfer. Embedding the conductor cables between protecting rubber reinforcement layers further protects the cables by allowing the stretch hose to absorb the stretch stress in addition to providing a solid state hose to prevent any mechanical sound or vibration within the hose from compromising any attached underwater device or sensor measurements.

Although some embodiments allow the conductor cables to be wrapped in a stretch neutral geometry, preferred embodiments of the stretch hose utilize conductor cable wrap angles substantially larger than the stretch neutral angle of 54 degrees, which to secure the cables within the hose body and allow for the increased load and elongation capacities of the improved stretchable hose. In such cases, the stretch hose is designed to bear the additional tensile load within the strength member layers, stretch limiter layers, and the reinforcement layers to ensure little to no strain due to elongation in placed on the cables and conductors. Accordingly, the tensile load capacity desired by the adaptive stretch hose design focuses primarily on transferring the tensile load onto the reinforcing wall members to bear the elongation and load stresses. In the embodiments employing a steeper conductor wrap angle, the stretch hose comprises a tensile strength of bearing up to 50,000 lbs or more.

Various materials and products may be used for the components included in the hose 300, including those identified elsewhere throughout the application. Table 3 below provides illustrative lower and upper bounds, along with a typical value for many of these components. The various components of the hose 300 may be varied according to need.

optical light guides. The metallic wires (e.g., copper) are typically insulated, while the optical light guides may or may not include outer metallic armoring. In embodiments employing copper materials, the conductors are adapted to carry high-throughput of at least megabit Ethernet over at least about 50 to about 100 foot lengths of the hose, and in some embodiments over 100 foot lengths. In other embodiments using optical light guides, the conductors are adapted to carry high-throughput of gigabit Ethernet over fiber. High-power carrying conductor cables are generally capable of carrying high-throughput of at least 1 kilowatt to about 1 megawatt of power.

Such conductor cables may comprise a large number of conductors (e.g., more than four) for providing high-throughput (e.g., high power or high speed data communications) along a resilient compliant path. Conductor cables have traditionally been constructed in straight conductor configurations (i.e., not with twisted pairs, stranded) for a variety of reasons, including the prospect of minimizing the cross-section of the conductor. Moreover, previous concerns that the use of twisted pairs within a flexible hose would cause the conductors to degrade faster than straight conductor configurations because of frequent bending and stretching in the twisted state, are not well-founded, and in the present invention, the twisting of conductors together both reduces electromagnetic interferences or crosstalk between conductive paths and provides enhanced mechanical properties. Additionally, the arrangement of twisted pair conductors provides less overall electrical losses than expected with a straight conductor configuration. A twisted configuration also contributes to the high-throughput capacities of the inventive stretch hose as high-throughput may be achieved by increasing the conductive cross-sectional area (i.e., the

TABLE 3

Exemplary bounds and common values for hose components.

| Parameter | Minimum | Typical | Maximum | Units |
|---|---|---|---|---|
| Hose length | 10 | 50 | 200 | feet |
| Hose outer diameter | 1 | 2 | 16 | inches |
| Hose inner diameter | 0.5 | 1 | 12 | inches |
| Hose wall thickness | 0.5 | 1 | 4 | inches |
| Hose elongation = L1/L0*100% | 100 | 250 | 300 | percent |
| Hose tensile load | 1,000 | 10,000 | 50,000 | lbs |
| Hose stretch cycle life | 1E6 | 24E6 | 30E6 | cycles |
| Hose life | 12 | 48 | 60+ | months |
| Reinforcing cord diameter | 0.01 | 0.02 | 0.03 | inches |
| Reinforcing cord wrap angle | 45 | 70 | 89 | degrees |
| Reinforcing cord wrap diameter | 0.75 | 1.5 | 14 | inches |
| Reinforcing cord compression | −20 | −8 | 0 | percent |
| Reinforcing cord elongation | 0 | 16 | 40 | percent |
| Conductor cable diameter | 0.01 | 0.15 | 0.5 | inches |
| Conductor cable wrap angle | 64 | 74 | 84 | degrees |
| Conductor cable pitch diameter | 0.8 | 2 | 15 | inches |
| Conductor cable axial compression | 0 | −13 | −20 | percent |
| Conductor cable elongation | 0 | 0.5 | 15 | percent |
| Number of conductor cables | 1 | 2 | 4+ | each |
| Number of conductors | 0 | 24 | 100+ | each |
| Number of twisted pairs | 0 | 2 | 10 | each |
| Conductor wire gauge | 40 | 22 | 0000 | AWG |
| Conductor/tension member diam. ratio | 0.01 | 0.3 | 1 | |
| Number of conductor layers | 0 | 1 | 2+ | each |
| Conductor twist angle on tension member | 30 | 45 | 60 | degrees |
| Number of optical fibers | 0 | 1 | 10 | each |
| Optical fiber diameter | 125 | 125 | 500 | microns |
| Optical fiber/tension member diam. ratio | 0.001 | 0.03 | 0.1 | |
| Optical fiber twist angle on tension member | 30 | 45 | 60 | degrees |

The conductors can be formed from one or more of several materials and products capable of conducting a signal, including, but not limited to, metallic wires and electrical current carrying area) by means of increasing the number of individual conductive paths (i.e., conductors) or increasing the diameter of one or more conductive paths.

However, conductor diameter is generally inversely proportional to flexibility as flexibility decreases with increasing wire diameter. Thus, utilizing a twisted pair configuration comprising multiple conductors allows for high-throughput while minimizing loss of flexibility.

The conductor cable (e.g., 306, 310) may be formed of many conductors, often eight but typically twenty four conductors. The conductors may be provided individually (e.g., stranded), in multiples (e.g., a twisted pair), or in combinations thereof, including two twisted pairs and two individual conductors. The eight conductor cable (an OCT, which may have four #22 straight conductors and two #24 unshielded twisted pairs (UTP)), a six conductor cable (a HEX, which may have six #22 straight conductors), and a four conductor cable (a QUAD, which may have four #22 straight conductors) are employed in some embodiments. A fourth cable may include any number of #22 straight conductors and a defined number of optical fibers. In some embodiments, the optical cable is configured as a formed coil-cord installable in a central hose cavity and separately coupled to hose end fittings.

In an exemplary construction, a stretch hose incorporates two "QUAD" conductor cables for a total of eight #22 straight conductors. In another construction, hoses are produced using a double layer of QUAD conductors, for a total of sixteen #22 wires. Other constructions, including one with two thirteen-conductor two-layer cables, and a double layer of six-conductor "HEX" cables, for a total of twenty-four straight #22 wires, have been produced and successfully deployed.

In another construction, a stretchable hose is based on the typical HEX constructed cables, but incorporates two unshielded twisted pairs (UTP) of #24 wire in place of two of the straight conductors to form an OCT-UTP cable. Such an OCT-UTP cable proved useful in experiments when transmitting Ethernet in both raw conductor cable form and in manufactured hoses. Even after deployment of nearly seven months, conductivity, and Ethernet testing was good, indicating a successful hose design. Such a hose often includes two OCT-UTP conductor cables, which may provide eight #22 straight conductors jacketed with Hytrel, and four #24 twisted pairs jacketed with FEP (fluorinated ethylene polymer). Such a hose may be outfitted with a standard 8-pin Subconn (MacArtney—Esbjerg, Denmark) MCIL8 connectors for the straight conductors, and two 8-pin Subconn Ethernet connectors for the four twisted pairs, allowing for two Ethernet links of 100 base T (two pairs per link). In some embodiments, a CAT5 cable is used to provide the Ethernet connection, and such a cable has been experimentally used to establish a 100 Mb link and transfer files of several gigabits without a failure of the connection or the cables. A CAT5e, CAT6, or other suitable signal-carrying cable may also utilized for the extended transmission of high-throughput in other embodiments.

Separate cables helically wrapped within the plurality of hose layers may be designated specifically for one type of high-throughput such as data or power. However, in embodiments employing many individual conductors within a conductor cable, data and power capacities are generally be incorporated into the same conductor cable, utilizing distinct conductive paths.

As can be appreciated, there are a large number of potential combinations as the stretchable hoses described herein may include more than a single conductor cable, and can be included in more than one layer. For example, four HEX cables are sometimes provided in two layers to provide twenty-four #22 straight conductors, two HEX cables and two OCT cables may be provided in two layers for a total of twenty #22 straight conductors and four UTP, or even a range of combinations of #22 straight conductors and optical fiber conductors. If a stretchable hose is large enough (e.g., with a 3" inner diameter and 24 strength member layers for a break strength exceeding 50,000 lbs.), twenty-four HEX cables for a total of 144 straight #22 conductors could be used (or the equivalent of two #4 wires).

Referring back to FIG. 4, the hose 40 also includes a coupling 41, which may be a modified ocean-resistant design from the standard weld-neck design, used in commercial pressure and suction hoses. The modified coupling design, shown in FIG. 9, in addition to its normal function of tension transfer from the strength member and stretch limiter layers of hose 40, allows the conductor cables to be guided out of the hose body to an external surface without exposure to water or corrosion, and also provides a customized fit to the buoyant object's reinforcing strength members and connecting hardware interfaces. Avoiding conductor exposure to water greatly improves conductor reliability and life expectancy. The hose couplings may be made of metal or any other solid, rigid material suitable for maritime usage.

In reference to FIG. 8, it may be desirable to include an ocean-resistant mechanical coupling adapted to resist corrosion and water leakage at one or both of the proximal and distal ends to couple the stretchable hose 300 to a buoyant object or another element. The mechanical coupling may be integral with the hose 300 or provided as a separate component. To facilitate transmission of the cable 306 from the hose 300 to an adjacent element, the cable 306 passes from the sidewall through the mechanical coupling, and passes through an interior cavity formed by the coupling.

FIG. 9 depicts a cross-section of a hose coupling 700 according to an illustrative embodiment. Hose coupling 700 is similar to coupling 41, shown in FIG. 4, and comprises a hollow cylindrical hose coupling with a cavity 720 in the center. Hose coupling 700 includes a first coupling section 702 and a second coupling insert 704, each of which are hollow. Second coupling insert 704 interfits within an internal cavity of first coupling section 702, for example via a threaded connection. The second coupling insert 704 allows the addition and/or removal of fill fluid into or out of the hose, and in some instances is closed with a check valve or plug, or the like (not shown). In some embodiments, the second coupling insert 704 is secured to the first coupling section 702 via alternative or additional methods. For example, in FIG. 9, the addition of potting compound 716 seals the interface of the second coupling insert 704 to the first coupling section 702. The potting compound 716 also protects the conductors 718 after their emergence from the hose wall. A flange on the top side of the first coupling section 702 is used for attaching the hose to different elements such as to the surface buoy or to the subsurface buoy shown in FIG. 2.

As the embedded conductor cables 718 approach the end of the first coupling section with the second coupling section, the embedded cables 718 pass through the first and/or the second coupling sections via, for example, a hole drilled into the wall of the first and/or the second coupling sections. As mentioned previously, the first and second coupling sections are typically hollow, allowing the cables 718 to pass through the central cavity 720 that extends through the two coupling sections. While the embedded conductor cables 718 are shown exiting from the potting compound 716, in other embodiments, the embedded cables 718 exit via the central cavity of the second coupling section 704. The cables 718 are able to pass from the hose to the coupling and out without being exposed to the external environment, thus minimizing corrosion and damage of the cables. There may be one hole or several holes bored through the coupling body near the flange to allow the cables 718 to be directly fed from their embedded position in the hose wall to the inner opening of the hose flange without coming into exposure to the seawater surrounding the buoyant object. In some embodiments, there is also a special cavity provided in the hose body (not shown here) into which the cables 718 are first fed before guided into the coupling cavity which later is filled with potting compound 716.

The first coupling section 702 includes a hose flange with one or more peripheral ridges 706. One or more of peripheral ridges 706 are generally continuous around the entire outer surface of the first coupling section 702. The hose coupling 700 includes a hose body with an inner liner layer 708, similar to inner liner layer 102 (FIG. 6), strength member layers 710 similar to the strength member layers 104 (FIG. 6), a reinforcement layer 712 with embedded cables 718, and an outer hose cover layer 714. This hose body is built up and secured over the peripheral ridges 706 by, for example, pressing the inner layer or reinforcement layers into the valleys between the ridges by applying tight wraps of tensioned fine seizing wire referred to as the binding wire layer 711 (i.e., binding means) which prevents the ribs being pulled over the external ribbon's "crowns" and disconnecting from the coupling 700. This reinforcement of the hose end allows for the transfer of hose tension to the coupling 700 for bearing more tensile load and elongation without disengaging with the coupling 700. In this embodiment, the couplings 700 become integral parts of a hose length, which transfer the longitudinal hose load into a fitting junction box or other hardware (not shown) at each hose end. In some embodiments, the hose body further includes additional rubber reinforcement layers as well as embedded specially reinforced fish bite prevention protective layers positioned between parts 712 and 714.

In some embodiments, hose couplings for one or both ends of the hose are mounted onto the mandrel. The hose couplings are generally mounted before the first inner liner layer is wrapped around the mandrel, or between any two successive layers wrapped around the mandrel. In other embodiments, the couplings are added to the hose after it has been formed on the mandrel.

Referring back to FIG. 4, in some embodiments, additional layers, such as strength member and stretch limiter layers, are positioned near the coupling. In such embodiments, the layers end staggered along a section of the hose body, starting from the coupling 41 to form a stretch and bend limiting zone. The extra reinforced stretch limiter layers in this zone are designed to allow a gradual decrease in stretch from the high strain under load in the center hose length to near zero hose stretch at the coupling by adding more and more forward helically wrapped stretch limiter layers with decreasing wrap angles towards the hose coupling. Large destructive extension and retraction of the hose under changing load levels in contact with the coupling's tubing are avoided. In certain embodiments, there are additional intermediate reinforcement layers of rubber which are sandwiched between or applied over the helically wrapped tire cord strength member layers for abrasion protection. The counter-helical second stretch limiter layer set are designed to minimize any torque and rotation development of the finished hose under tension, to prevent rotation of the hose under applied mooring tensions as well as withstand the bending and stretching motions in use without damage.

Optionally, other layers providing other functionality may be integrated into the manufacturing process after the integration of the conductor cables. In some embodiments, an additional reinforcement layer is applied straight in Step 27, similar to the layers wrapped in Steps 11 and 12, and optionally further comprises reinforcing fiber cords for added tensile strength if desired.

A reinforced outer jacket layer assembly 713 of protective layers and reinforcement layers is typically applied, shown in Steps 28 to 30 in Table 2. The reinforced outer jacket protects the cables, the conductors, and the other hose layers from external pressure, cuts, fish bite, and corrosion and increase the tensile strength of the hose. In some embodiments, the protective layers are applied on the exterior of the hose (after Step 27), or just before the application of the hose cover layer in Step 32. This assembly includes at least one (often two) high strength protective layers with reinforcing cords, where the reinforcing cords are fabricated from cut-resistant material. A rubber reinforcement layer is disposed after the first high strength layer as a separation layer between the first and second protective layers.

Referring back to FIGS. 8A-8C, the protective layers of the reinforced outer jacket 314 are applied over the conductors and the conductor cover layer 312 with high wrap angles to maintain near zero cord stretch and tension over the entire hose stretch range. In some embodiments, the protective layers are helically wrapped at wrap angles greater than 60 degrees, but are often wrapped at angles between 70 degrees and 89 degrees. In an exemplary embodiment, the protective layers are wrapped at an angle greater than 75 degrees. The first protective layer are wrapped at a high angle in a counter helical direction followed by a reinforcement layer wrapped in a forward helical direction. In such instance with a second protective layer, the layer is also wrapped in a forward helical direction and in some cases at a slightly higher wrap angle than the first high strength layer.

The protective layers may comprise a cut-resistance material such as a para-aramid synthetic fiber, meta-aramid synthetic fiber, liquid crystal polymer, nylon, polytetrafluoroethylene, thermoplastic polyethylene, Kevlar®, natural rubber, synthetic rubber, or other suitable material or combination of materials.

The final production Step 32 includes an outer hose cover layer 714 to complete the hose which relies on a rubber reinforcement layer to secure all previously wrapped layers of the hose body.

After completion of the manufacturing process, the hose usually undergoes the vulcanization process, where the hose is transformed into a highly elastic, high strength composite of hose wall layers. In Step 33, the heat-curable hose is coated with an outer rubber hose cure tape layer, and the entire hose system is vulcanized to cross-link and cure the rubber layers present in the hose. The vulcanization process is often performed by placing the hose system into an autoclave and exposing for several hours to a pressurized stem environment. The vulcanization or curing process changes the rubber and completed hose wall and surface from fairly soft putty-like crude material to a highly elastic and tough material with a tire-like feel, increasing the tensile strength of the hose. Furthermore, vulcanization promotes the bonding and strengthens the mechanical support of the individual layers for absorbing tensile forces applied during stretching and bending of the stretch hose and relieving the strains on the cables and conductors.

In some embodiments, helical groove indents or ridges (i.e., an outer helical surface ridge) are disposed on the outer layer of the stretch hose. As known by those in the art, transverse fluid flow (i.e., flow eddies) past the body of a hose generates substantial lift and drag often causing unbalanced forces and resonant vibrations referred to as strumming. Breaking up the coherence of flow eddies reduces strumming and increases the lifespan of the hose. In some cases, the embedded helical groove indents into the surface of the hose are formed by wrapping one or more nylon cords around the completed stretch hose (Step 34, Table 2) prior to vulcanization which are then removed after the vulcanization process, leaving behind indents. Other suitable methods to form surface structures or indents may also be employed to reduce the interference of flow eddies.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The compositions, components, and functions can be combined in various combinations and permutations, to achieve a desired result. For example, all materials for components (including materials not necessarily previously described) that are suitable for the application are considered within the scope of the invention. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

TABLE 2

| Step # | Layer Description | Layer Type | Wrap Angle [deg] | Layer OD [in] | Ribbon Thickness [in] | Ribbon Width [in] | Butt Lap Width [in] | Wrap Direction | Step # | Application instructions |
|---|---|---|---|---|---|---|---|---|---|---|
| 1 | Inner Tube Liner Application | Reinforcement layer | 50 ≤ Deg ≤ 60 | 1.126 | 0.032 | 4.00 | 2.00 | <<<< | 1 | Counter helical wrap full length of hose |
| 2 | Main Strength Member #1 | Strength member layer | 65 ≤ Deg ≤ 75 | 1.192 | 0.032 | 1.38 | 1.25 | >>>> | 2 | Forward helical wrap butt lap cord as applied |
| 3 | Main Strength Member #2 | Strength member layer | 65 ≤ Deg ≤ 75 | 1.256 | 0.032 | 1.38 | 1.32 | >>>> | 3 | Forward helical wrap one piece to butt lap, offset from first cord over-lap by ⅝" |
| 4 | Main Strength Member #3 | Strength member layer | 65 ≤ Deg ≤ 75 | 1.320 | 0.032 | 1.50 | 1.36 | >>>> | 4 | Forward helical wrap offset from 2nd cord overlap by ⅝", one piece to butt lap |
| 5 | Main Strength Member #4 | Strength member layer | 65 ≤ Deg ≤ 75 | 1.364 | 0.032 | 1.50 | 1.45 | >>>> | 5 | Forward helical wrap off set from third cord overlap by ⅝" one piece to butt lap |
| 6 | Main Strength Member #5 | Strength member layer | 65 ≤ Deg ≤ 75 | 1.446 | 0.032 | 1.50 | 1.52 | >>>> | 6 | Forward helical wrap off set from 4th cord overlap by ⅝" one piece to butt lap |
| BW-1 | First Binding Wire | Binding wire layer | | | | | | | BW-1 | |
| 7 | Highest Stretch Limiter | Stretch limiter layer | 55 ≤ Deg ≤ 75 | 1.512 | 0.032 | 2.36 | 2.32 | >>>> | 7 | Forward helical wrap: apply one piece to butt lap inhose - no butt lap required over the nipples |
| 8 | High Stretch Limiter | Stretch limiter layer | 45 ≤ Deg ≤ 65 | 1.576 | 0.032 | 3.13 | 3.12 | >>>> | 8 | Forward helical wrap: apply one piece to butt lap inhose - no butt lap required over the nipples |
| 9 | Medium Stretch Limiter | Stretch limiter layer | 35 ≤ Deg ≤ 55 | 1.640 | 0.032 | 3.88 | 3.87 | >>>> | 9 | Forward helical wrap no butt lap required over the nipples |
| 10 | Low Stretch Limiter | Stretch limiter layer | 25 ≤ Deg ≤ 55 | 1.704 | 0.032 | 4.63 | 4.55 | >>>> | 10 | Forward helical wrap: apply one piece to butt lap inhose - no butt lap required over the nipples |
| 11 | First Straight End Block #1 | Stretch limiter layer | N/A | N/A | N/A | 4.63 | N/A | ==== | 11 | 4 pcs - Apply straight - start 36" from face of the flange |
| 12 | Second Straight End Block #2 | Stretch limiter layer | N/A | N/A | N/A | 4.63 | N/A | ==== | 12 | 4 pcs - Apply straight - start 26" from face of flange |
| 13 | Rubber Separation Layer | Reinforcement layer | 50 ≤ Deg ≤ 60 | 1.576 | 0.032 | 4.00 | 2.00 | >>>> | 13 | Forward helical wrap full length of hose |
| 14 | Low Stretch Limiter | Stretch limiter layer | 25 ≤ Deg ≤ 55 | 1.768 | 0.032 | 4.63 | 4.72 | <<<< | 14 | Counter helical wrap apply one piece to butt lap in hose - no butt lap required over the nipples |
| 15 | Medium Stretch Limiter | Stretch limiter layer | 35 ≤ Deg ≤ 55 | 1.704 | 0.032 | 3.66 | 4.02 | <<<< | 15 | Counter helical wrap apply one piece to butt lap in hose - no butt lap required over the nipples |
| 16 | High Stretch Limiter | Stretch limiter layer | 45 ≤ Deg ≤ 65 | 1.640 | 0.032 | 3.13 | 3.25 | <<<< | 16 | Counter helical wrap apply one piece to butt lap in hose - no butt lap required over the nipples |
| 17 | Highest Stretch Limiter | Stretch limiter layer | 55 ≤ Deg ≤ 75 | 1.576 | 0.032 | 2.38 | 2.43 | <<<< | 17 | Counter helical wrap: apply one piece to butt lap in hose - no butt lap required over the nipples |
| BW-2 | Second Binding Wire | Binding wire layer | | | | | | | BW-2 | |
| 18 | Main Strength Member #6 | Strength member layer | 65 ≤ Deg ≤ 75 | 1.640 | 0.032 | 1.75 | 1.73 | <<<< | 18 | Apply cord counter helical on the lathe One piece to butt lap |
| 19 | Main Strength Member #7 | Strength member layer | 65 ≤ Deg ≤ 75 | 1.704 | 0.032 | 1.75 | 1.80 | <<<< | 19 | Apply cord counter helical on the lathe Off set from cord #6 by ¾" One piece to butt lap |
| 20 | Main Strength Member #8 | Strength member layer | 65 ≤ Deg ≤ 75 | 1.768 | 0.032 | 1.66 | 1.87 | <<<< | 20 | Apply cord counter helical on the lathe Off set from cord #7 by ¾" Apply one piece to butt lap |
| 21 | Main Strength Member #9 | Strength member layer | 65 ≤ Deg ≤ 75 | 1.632 | 0.032 | 1.88 | 1.93 | <<<< | 21 | Apply cord counter helical on the lathe Off set from cord #8 by ¾" Apply one piece to butt lap |
| BW-3 | Third Binding Wire | Binding wire layer | | | | | | | BW-3 | |
| 22 | Conductor Bedding Layer | Reinforcement layer | 65 ≤ Deg ≤ 60 | 1.960 | 0.032 | 4.00 | 2.00 | >>>> | 22 | Forward helical wrap full length of hose |
| 23 | 1st Cable Layer | | 64 ≤ Deg ≤ 84 | 1.81 | 0.215 | N/A | 1.81 | <<<< | 23 | Counter helical wrap |
| 24 | Conductor Spacer Layer | Reinforcement layer | 70 ≤ Deg ≤ 89 | 2.358 | 0.032 | 4.00 | 2.00 | >>>> | 24 | Forward helical wrap. One pass to double butt lap, full length of hose |
| 25 | 2nd Cable Layer | | 64 ≤ Deg ≤ 84 | N/A | 0.215 | N/A | 1.83 | <<<< | 25 | Counter helical wrap. |
| 26 | Conductor Cover Layer | Reinforcement layer | 65 ≤ Deg ≤ 80 | 2.614 | 0.032 | 4.00 | 2.00 | >>>> | 26 | Forward helical wrap. Two passes to double butt lap, full length of hose |
| 27 | Straight End Block #3 | Stretch limiting layer | N/A | N/A | N/A | 4.63 | N/A | ==== | 27 | 4 pcs - Apply straight - start 27" from face of the flange |
| 28 | First Aramid Cord Layer | Protection layer | 70 ≤ Deg ≤ 89 | 2.678 | 0.032 | 2.00 | 2.00 | <<<< | 28 | Counter helical wrap. |
| 29 | Rubber Separation Layer | Reinforcement layer | 70 ≤ Deg ≤ 89 | 2.806 | 0.032 | 4.00 | 2.00 | >>>> | 29 | Forward helical wrap. |
| 30 | Second Aramid Cord Layer | Protection layer | 70 ≤ Deg ≤ 89 | 2.870 | 0.032 | 2.00 | 2.00 | >>>> | 30 | Forward helical wrap |
| 31 | Final Taper of End Fittings | | | | | | | | 31 | |
| 32 | Hose Cover | Reinforcement layer | 70 ≤ Deg ≤ 89 | 3.062 | 0.032 | 4.00 | 1.33 | <<<< | 32 | Counter helical wrap full length of hose |
| 33 | Cure Tape | | 70 ≤ Deg ≤ 89 | 3.446 | 0.032 | 2.00 | 1.00 | | 33 | 3 Passes to double lap |
| 34 | Optional Surface Ridge Layer | Ridge layer | | | | | | | 34 | Wrap cord around cure tape |

What is claimed is:

1. A stretchable multi-layered, ocean-resistant hose apparatus comprising:
a stretchable hose comprising:
a plurality of layers comprising:
at least one strength member layer comprising reinforcing fiber cords;
at least one stretch limiter layer; and
at least one reinforcement layer,
wherein each of the plurality of layers is helically wrapped about an inner liner layer, wherein the plurality of layers comprises an elastomeric material adapted to provide stretching of the hose to a stretched length greater than 200 percent of an unstretched length of the hose, and wherein the hose is adapted to be heat-curable to increase tensile strength;
at least one conductor cable, each conductor cable comprising a conductive cross-sectional area capable of high-throughput of at least one of data, power, and communication and helically wrapped in a corresponding cable layer, at least one cable layer located between the plurality of layers,
wherein at least one conductor cable in a first cable layer forms a first helical ridge and a first helical valley and a second at least one conductor cable in a second cable layer is disposed within the first helical valley, between the first helical ridge, and
wherein a conductor spacer layer is located between the first conductor cable layer and the second conductor cable layer; and
an ocean-resistant coupling engaged with an end of the stretchable hose and adapted to couple the stretchable hose to a buoyant object, wherein the coupling is adapted to resist corrosion and water leakage; and
wherein the hose apparatus is adapted to stretch a predetermined amount to accommodate a predicted vertical heave of a buoyant object.

2. The stretchable hose of claim 1, wherein the at least one strength member layer has a strength member helical wrap angle of between about 60 degrees and about 85 degrees relative to a cable axis and is adapted to provide the hose with a tensile strength of between about 1,000 lbs and at least about 50,000 lbs.

3. The stretchable hose of claim 1, wherein the at least one stretch limiter layer has a stretch limiter helical wrap angle of between about 25 degrees and about 75 degrees relative to a cable axis.

4. The hose of claim 1, wherein the hose is adapted to survive about one million to about ten million stretch cycles.

5. The stretchable hose of claim 1, further comprising binding means adjacent the end of the hose engaged with the coupling.

6. The stretchable hose of claim 1, wherein the elastomeric material is selected from the group consisting of natural rubber, synthetic rubber, neoprene, Buna-N, latex, ethylene propylene diene monomer (EPDM), butyl rubber, silicone, nylon, FKM, and combinations thereof.

7. The stretchable hose of claim 1, further comprising a reinforced outer jacket to protect the cables, the conductors, and the other hose layers from external pressure, cuts, fish bite, and corrosion and increase the tensile strength capacity of the hose.

8. A stretchable multi-layered, ocean-resistant, high-throughput hose apparatus comprising:
a stretchable hose comprising:
a plurality of layers comprising:
at least one strength member layer comprising reinforcing fiber cords;
at least one stretch limiter layer;
at least one reinforcement layer,
wherein each of the plurality of layers is helically wrapped about an inner liner layer; and
a plurality of conductor cables, each conductor cable comprising a conductive cross-sectional area capable of high-throughput of at least one of data, power, and communication and helically wrapped in a corresponding cable layer, at least one cable layer located between the plurality of layers,
wherein at least one conductor cable in a first cable layer forms a first helical ridge and a first helical valley and a second at least one conductor cables in a second cable layer is disposed within the first helical valley, between the first helical ridge, and
wherein a conductor spacer layer is located between the first conductor cable layer and the second conductor cable layer; and
an ocean-resistant coupling engaged with an end of the stretchable hose and adapted to couple the stretchable hose to a buoyant object,
wherein the hose apparatus is adapted to stretch a predetermined amount to accommodate a predicted vertical heave of the buoyant object.

9. The stretchable hose of claim 8, wherein each conductor cable comprises at least two conductors arranged in a twisted pair.

10. The stretchable hose of claim 8, wherein each conductor cable comprises two or more twisted pairs.

11. The stretchable hose of claim 8, wherein at least one conductor cable is adapted to provide high-throughput of at least megabit Ethernet to gigabit Ethernet.

12. The stretchable hose of claim 8, wherein at least one conductor cable is adapted to provide high-throughput of at least about 1 kilowatt to about 1 megawatt of power.

13. The stretchable hose of claim 8, wherein the ocean-resistant coupling is adapted to pass at least one conductor cable from within the plurality of layers through the hose coupling to an external surface without exposure to water or corrosion.

14. The stretchable hose of claim 8, wherein each conductor cable is wrapped at a steep wrap angle of between about 64 degrees and about 84 degrees relative to a cable axis.

15. A method for manufacturing the stretchable multi-layered, ocean-resistant hose apparatus of claim 8, the method comprising the steps of:
forming a stretchable hose comprising the steps of:
providing an inner liner layer defining a central core;
wrapping an inner strength member set comprising at least one layer with reinforcing fiber cords in a forward helical direction about the inner liner layer in overlapping convolutions;
wrapping a first stretch limiter set in a forward helical direction about the inner strength member set;
wrapping a reinforcement layer about the first stretch limiter set;
wrapping a second stretch limiter set about the reinforcement layer in a counter helical direction;
wrapping an outer strength member set comprising at least one layer with reinforcing fiber cords in a counter helical direction about the second stretch limiter set in overlapping convolutions;
counter-helically wrapping a first plurality of conductor cables in a corresponding first cable layer, such that the first plurality of conductor cables forms a first helical ridge and a first helical valley;

wrapping a second at least one conductor cable in a second cable layer, such that the second at least one conductor cable is disposed within the first helical valley, between the first helical ridge;

wrapping a conductor spacer layer between the first at least one conductor cable and the second at least one conductor cable, wherein each of the first and second at least one conductor cables comprises a conductive cross-sectional area capable of high-throughput; and covering the wrapped layers with a reinforced outer jacket comprising at least one protective layer, wherein each wrapped layer comprises elastomeric material; and engaging an end of the hose with an ocean-resistant coupling.

16. The method of claim 15, wherein the inner strength member set is helically wrapped at an angle between about 60 degrees and about 85 degrees relative to a cable axis.

17. The method of claim 15, wherein the first stretch limiter set comprises stretch limiter layers helically wrapped at decreasing wrap angles about the inner strength member set.

18. The method of claim 15, wherein the second stretch limiter set comprises stretch limiter layers helically wrapped at increasing wrap angles about the reinforcement layer.

19. The method of claim 15, wherein the stretch limiter sets are wrapped at wrap angles between about 25 degrees and about 75 degrees relative to a cable axis.

20. The method of claim 15, further comprising securing an end of the stretchable hose with the coupling via binding means.

21. The method of claim 15, wherein the reinforced outer jacket comprises material selected from the group consisting of natural rubber, synthetic rubber, para-aramid synthetic fiber, meta-aramid synthetic fiber, liquid crystal polymer, nylon, polytetrafluoroethylene, thermoplastic polyethylene, and combinations thereof.

22. The method of claim 15, wherein the elastomeric material is selected from the group consisting of natural rubber, synthetic rubber, neoprene, Buna-N, latex, ethylene propylene diene monomer (EPDM), butyl rubber, silicone, nylon, FKM, and combinations thereof.

23. The method of claim 15, wherein the hose further comprises an outer helical surface ridge disposed on an outer layer of the hose.

24. The method of claim 15, further comprising at least one additional cable secured and insulated with a reinforcement layer helically wrapped around the cable, wherein said additional cable is disposed adjacent to the first helical ridge within the first helical valley.

25. The method of claim 24, further comprising securing and insulating the conductor cables to form up to ten helical ridges and up to ten helical valleys.

26. The method of claim 15, wherein at least one conductor cable is wrapped at one or more steep wrap angles between about 64 degrees and about 84 degrees.

27. The method of claim 26, wherein at least one conductor cable is wrapped at one or more steep wrap angles between about 70 degrees and about 80 degrees.

28. The method of claim 15, further comprising increasing the conductive cross-sectional area to facilitate high-throughput.

29. The method of claim 28, wherein at least one conductor cable comprises at least two conductors to facilitate high-throughput and increase the number of individual conductive paths.

30. The method of claim 29, wherein at least one conductor cable comprises at least two conductors arranged in a twisted pair.

31. The method of claim 30, wherein at least one conductor cable comprises two or more twisted pairs.

32. The method of claim 15, wherein at least one conductor cable is adapted to carry high-throughput of at least megabit Ethernet over at least about 50 to about 100 foot lengths of the hose or gigabit Ethernet over fiber.

33. The method of claim 15, wherein at least one conductor cables is adapted to carry high-throughput of at least about 1 kilowatt to about 1 megawatt of power.

34. The method of claim 15, further comprising passing at least one conductor cable through the hose coupling to an external surface without exposure to corrosion or water.

35. The method of claim 15, further comprising the step of heat curing the hose to increase tensile strength.

* * * * *